(12) United States Patent
Jeong et al.

(10) Patent No.: US 11,348,306 B2
(45) Date of Patent: May 31, 2022

(54) METHOD, APPARATUS, AND RECORDING MEDIUM FOR PROCESSING IMAGE

(71) Applicant: SAMSUNG ELECTRONICS CO., LTD., Suwon-si (KR)

(72) Inventors: Jae-yun Jeong, Suwon-si (KR); Do-wan Kim, Suwon-si (KR); Yong-gyoo Kim, Seoul (KR); Gun-hee Lee, Anyang-si (KR); Jae-kyeong Lee, Yongin-si (KR); Jin-bong Lee, Seoul (KR); Dai-woong Choi, Suwon-si (KR); Hyun-soo Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/888,036

(22) Filed: May 29, 2020

(65) Prior Publication Data

US 2020/0294304 A1  Sep. 17, 2020

Related U.S. Application Data

(63) Continuation of application No. 15/584,274, filed on May 2, 2017, now Pat. No. 10,672,180.

(Continued)

(30) Foreign Application Priority Data

Jun. 27, 2016 (KR) .......... 10-2016-0080239
Jul. 15, 2016 (KR) .......... 10-2016-0090270

(51) Int. Cl.
*G06T 15/50* (2011.01)
*G06T 19/00* (2011.01)
(Continued)

(52) U.S. Cl.
CPC .............. *G06T 15/20* (2013.01); *G06F 3/011* (2013.01); *G06T 3/0062* (2013.01); *G06T 15/10* (2013.01);
(Continued)

(58) Field of Classification Search
None
See application file for complete search history.

(56) References Cited

U.S. PATENT DOCUMENTS 6,047,088 A  4/2000  van Beek et al.
6,754,400 B2  6/2004  Florin et al.
(Continued)

FOREIGN PATENT DOCUMENTS

EP  1 622 361 A2  2/2006
JP  2007318597 A  12/2007
WO  2011/029209 A2  3/2011

OTHER PUBLICATIONS

Communication dated Feb. 21, 2019, issued by the European Patent Office in counterpart European Application No. 17792880.1.
(Continued)

*Primary Examiner* — Yanna Wu
(74) *Attorney, Agent, or Firm* — Sughrue Mion, PLLC

(57) ABSTRACT

A method of processing an image by a device obtaining one or more images including captured images of objects in a target space, generating metadata including information about mapping between the one or more images and a three-dimensional (3D) mesh model used to generate a virtual reality (VR) image of the target space, and transmitting the one or more images and the metadata to a terminal.

14 Claims, 25 Drawing Sheets

US 11,348,306 B2
Page 2

Related U.S. Application Data

(60) Provisional application No. 62/330,351, filed on May 2, 2016.

(51) Int. Cl.

| | | |
|---|---|---|
| *G06T 15/20* | (2011.01) | |
| *H04N 13/279* | (2018.01) | |
| *G06T 15/10* | (2011.01) | |
| *G06T 3/00* | (2006.01) | |
| *G06F 3/01* | (2006.01) | |
| *G06T 15/40* | (2011.01) | |
| *H04N 13/178* | (2018.01) | |
| *H04N 13/275* | (2018.01) | |
| *H04N 13/207* | (2018.01) | |

(52) U.S. Cl.
CPC ............ *G06T 15/40* (2013.01); *G06T 15/503* (2013.01); *G06T 19/006* (2013.01); *H04N 13/279* (2018.05); *G06T 2200/04* (2013.01); *G06T 2200/24* (2013.01); *H04N 13/178* (2018.05); *H04N 13/207* (2018.05); *H04N 13/275* (2018.05)

(56) References Cited

U.S. PATENT DOCUMENTS

| | | | |
|---|---|---|---|
| 8,941,749 B2 | 1/2015 | Yahata | |
| 9,311,746 B2 | 4/2016 | Gravois et al. | |
| 2002/0147991 A1 | 10/2002 | Furlan et al. | |
| 2007/0110338 A1 | 5/2007 | Snavely et al. | |
| 2009/0268046 A1 | 10/2009 | Ogawa | |
| 2012/0050484 A1* | 3/2012 | Boross ................. | H04N 13/261 348/46 |
| 2013/0124471 A1 | 5/2013 | Chen et al. | |
| 2014/0139552 A1 | 5/2014 | Morinaga et al. | |
| 2014/0146131 A1 | 5/2014 | Niemi | |
| 2014/0247974 A1* | 9/2014 | Figg ..................... | G01N 21/253 382/133 |
| 2014/0285486 A1 | 9/2014 | Chang et al. | |
| 2015/0091905 A1* | 4/2015 | Wang .................... | G06T 19/00 345/427 |
| 2015/0249815 A1 | 9/2015 | Sandrew et al. | |
| 2015/0271393 A1 | 9/2015 | Cudak et al. | |
| 2016/0065946 A1 | 3/2016 | Cole et al. | |
| 2017/0006234 A1 | 1/2017 | Higuchi et al. | |
| 2017/0085733 A1* | 3/2017 | Ilic ......................... | G06T 17/20 |
| 2017/0154420 A1* | 6/2017 | Barnes ................... | G06T 5/003 |
| 2017/0366814 A1* | 12/2017 | Adsumilli ............ | H04N 19/167 |

OTHER PUBLICATIONS

International Search Report and Written Opinion issued by the International Searching Authority dated Aug. 16, 2017 in counterpart International Patent Application No. PCT/KR2017/004650 (PCT/ISA/220, PCT/ISA/210 & PCT/ISA/237).

Communication dated Jan. 12, 2022, issued by the European Patent Office in European Application No. 21167417.1.

Jeong et al., "OMAF: Camera and Lens Parameter for Omnidirectional Media." ISO/IEC JTC1/SC29/WG11, Oct. 12, 2016, XP030067286, Total 11 pages.

Forutanpour et al., "Signalling of fisheye VR video information in ISO BMFF," ISO/IEC JTC1/SC29/WG11, May 25, 2016, XP030269365, Total 7 pages.

Huang et al., "Wide-angle vision for road views," Opto-Electronics Review, vol. 21, No. 1, Dec. 29, 2012, XP035160063, Total 22 pages.

\* cited by examiner

FIG. 7B
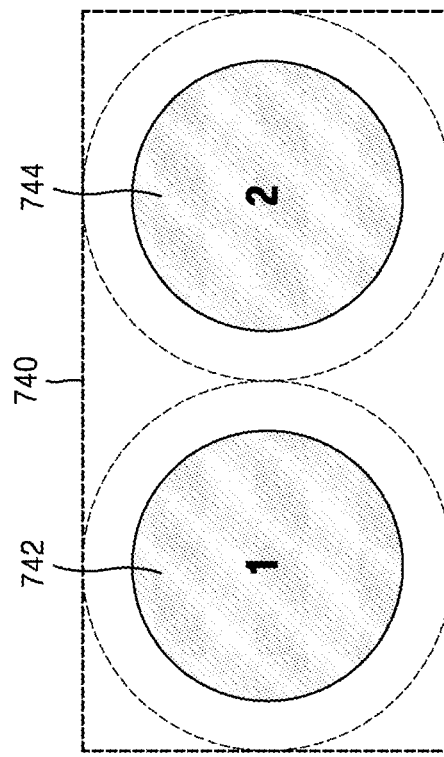
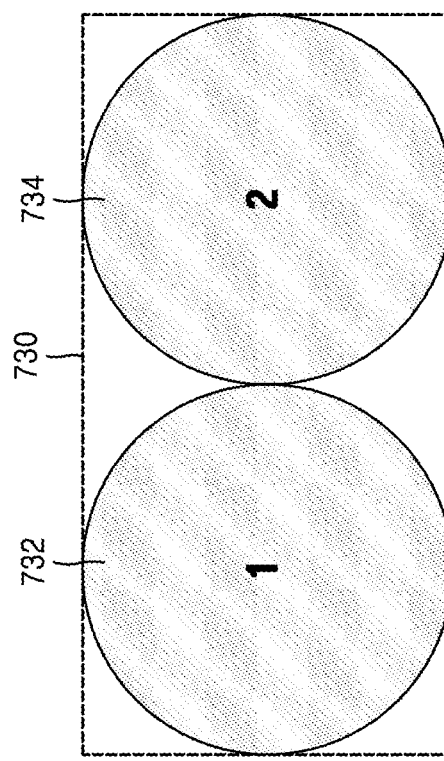

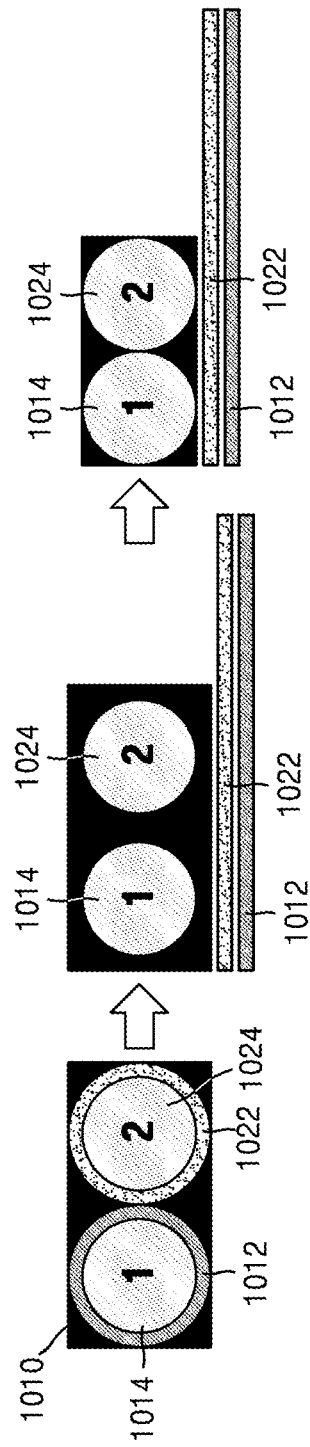

METHOD, APPARATUS, AND RECORDING MEDIUM FOR PROCESSING IMAGE

CROSS-REFERENCE TO RELATED APPLICATIONS

This application is a continuation of U.S. patent application Ser. No. 15/584,274, filed on May 2, 2017 in the U.S. Patent and Trademark Office, which claims benefit from U.S. Provisional Application No. 62/330,351, filed on May 2, 2016 in the U.S. Patent and Trademark Office, and claims priority from Korean Patent Application No. 10-2016-0080239, filed on Jun. 27, 2016, and Korean Patent Application No. 10-2016-0090270, filed on Jul. 15, 2016 in the Korean Intellectual Property Office, the disclosures of which are incorporated herein by reference in their entireties.

BACKGROUND

1. Field

Methods and apparatuses consistent with exemplary embodiments relate to a method and apparatus for processing an image, and a recording medium having recorded thereon a program for executing the method of processing an image.

2. Description of the Related Art

Virtual reality (VR) may indicate an interface between a user and a device, which involves rendering, by a computer, a specific environment or situation and enabling the user to interact as if in a real environment or situation. A device which is capable of providing virtual reality to a user, provides a user interface that shows the user a situation or environment which the user has not experienced directly, and allows the user to manipulate the situation or environment.

With recent increased interest in virtual reality, techniques for implementing VR have been actively developed. In particular, research into techniques for processing images including a virtual space needed to implement VR has been actively carried out.

SUMMARY

The present disclosure provides a method, apparatus, and recording medium for processing an image, to prevent the quality of a virtual reality (VR) image from being degraded due to distortion, such as warping, which may occur when the VR image of a specific space is rendered.

Additional aspects will be set forth in part in the description which follows and, in part, will be apparent from the description, or may be learned by practice of the presented exemplary embodiments.

According to an aspect of an exemplary embodiment, a method, performed by a device, of processing an image includes obtaining one or more images including captured images of objects in a target space, generating metadata including information about mapping between the one or more images and a three-dimensional (3D) mesh model used to generate a virtual reality (VR) image of the target space, and transmitting the one or more images and the metadata to a terminal.

The information about the mapping may include at least one of an angle at which the one or more images are captured, a position of a capturing device that captures at least one of the one or more images, a type of the 3D mesh model, and a resolution of the 3D mesh model.

The one or more images may be a plurality of images, and the metadata may include at least one of quality correction information for the plurality of images, and weight information for a region which includes an object overlapping between two images of the plurality of images.

The method may further include obtaining information about noise of the one or more images, and correcting the one or more images by correcting pixel values of pixels included in the one or more images, based on the obtained information about the noise, wherein the transmitting of the one or more images may include transmitting the corrected one or more images to the terminal, together with the metadata.

The one or more images may be a plurality of images, and the method may further include determining, from among objects included in the plurality of images, an overlapping object which overlaps between two images of the plurality of images, converting an image including the overlapping object by blending pixel values corresponding to a region which includes the overlapping object in the two images according to a preset value, and projecting the converted image using a normalized camera pose, wherein the transmitting of the one or more images may include transmitting the projected converted image to the terminal, together with the metadata.

According to another aspect of an exemplary embodiment, a method, performed by a terminal, of processing an image includes obtaining, from a device, one or more images including captured images of objects in a target space and metadata regarding the one or more images, obtaining, from the metadata, information about mapping between the one or more images and a 3D mesh model used to generate a VR image of the target space, generating the VR image of the target space by rendering the one or more images based on the information about the mapping; and outputting the generated VR image.

The information about the mapping may include at least one of an angle at which the one or more images are captured, a position of a capturing device that captures at least one of the one or more images, a type of the 3D mesh model, and a resolution of the 3D mesh model.

The one or more images may be a plurality of images, and, the metadata may include at least one of quality correction information for the plurality of images and weight information for a region which includes an overlapping object which overlaps between two images of the plurality of images.

The method may further include correcting the plurality of images by correcting pixel values of pixels included in the plurality of images, based on the quality correction information, wherein the generating of the VR image may include generating the VR image of the target space by rendering the corrected plurality of images based on the information about the mapping.

The method may further include converting an image including the overlapping object by blending pixel values corresponding to the region which includes the overlapping object in the plurality of images according to a preset weight value, based on weight information included in the metadata, and projecting the converted image using a normalized camera pose, wherein the generating of the VR image may include generating the VR image of the target space by rendering the projected converted image based on the information about the mapping.

According to yet another aspect of an exemplary embodiment, a device for processing an image includes an image obtainer configured to obtain one or more images including captured images of objects in a target space, a controller configured to generate metadata including information about mapping between the one or more images and a 3D mesh model used to generate a VR image of the target space, and a communication interface configured to transmit the one or more images and the metadata to a terminal.

The information about the mapping may include at least one of an angle at which the one or more images are captured, a position of a capturing device that captures the one or more images, a type of the 3D mesh model, and a resolution of the 3D mesh model.

The one or more images may be a plurality of images, and the metadata may include at least one of quality correction information for the one or more images, and weight information for a region which includes an object overlapping between two images of the plurality of images.

The controller may be further configured to obtain information about noise of the one or more images, and to correct the one or more images by correcting pixel values of pixels included in the one or more images, based on the obtained information about the noise, and the communication interface may be further configured to transmit the corrected one or more images to the terminal, together with the metadata.

The one or more images may be a plurality of images, and the controller may be further configured to determine, from among objects included in the plurality of images, an overlapping object which overlaps between two images of the plurality of images to convert an image including the overlapping object by blending pixel values corresponding to a region which includes the overlapping object in the two images according to a preset value, and to project the converted image using a normalized camera pose, and the communication interface may be further configured to transmit the projected converted image to the terminal, together with the metadata.

According to a further aspect of an exemplary embodiment, a terminal for processing an image includes a communication interface configured to obtain one or more images including a captured image of objects included in a target space and metadata regarding the one or more images from a device, a controller configured to obtain, from the metadata, information about mapping between the one or more images and a 3D mesh model used to generate a virtual reality (VR) image of the target space, and to generate the VR image of the target space by rendering the one or more images based on the information about the mapping, and an output interface configured to output the generated VR image.

The information about the mapping may include at least one of an angle at which the one or more images are captured, a position of a capturing device that captures at least one of the one or more images, a type of the 3D mesh model, and a resolution of the 3D mesh model.

The one or more images may be a plurality of images, and the metadata may include at least one of quality correction information for the plurality of images and weight information for a region which includes an overlapping object which overlaps between two images of the plurality of images.

The controller may be further configured to correct the plurality of images by correcting pixel values of pixels included in the one or more images, based on quality correction information included in the metadata and to generate the VR image of the target space by rendering the corrected plurality of images based on the information about the mapping.

The controller may be further configured to convert an image including the overlapping object by blending pixel values corresponding to the region which includes the overlapping object in the two images according to a preset weight value, based on weight information included in the metadata, to project the converted image using a normalized camera pose, and to generate the VR image of the target space by rendering the projected converted image based on the information about the mapping.

According to a still further aspect of an exemplary embodiment, a non-transitory computer-readable recording medium may have recorded thereon a program for executing the methods described herein.

According to another aspect of an exemplary embodiment, a method of processing an image includes obtaining one or more captured images of a target space, generating, by a device, mapping information corresponding to a mapping between the one or more captured images and a 3D mesh model, generating metadata including the mapping information, transmitting the one or more captured images and the metadata to a terminal, and generating a virtual reality image of the target space by rendering, by the terminal, the one or more captured images based on the mapping information.

The method may further include generating, by the device, image correction information comprising at least one of quality correction information and weight value information, and processing the one or more captured images based the image correction information, wherein the transmitting further includes transmitting the processed one or more captured images, and wherein the generating of the virtual reality image further includes rendering, by the terminal, the processed one or more captured images based on the mapping information.

The method may further include generating, by the device, image correction information comprising at least one of quality correction information and weight value information, wherein the metadata further includes the image correction information, and wherein the generating of the virtual reality image further includes rendering, by the terminal, the one or more captured images based on the mapping information and the image correction information.

BRIEF DESCRIPTION OF THE DRAWINGS

The above and/or other aspects will become apparent and more readily appreciated from the following description of exemplary embodiments, taken in conjunction with the accompanying drawings in which:

FIGS. 7A, 7B and 7C are flow diagrams of a method, performed by a device, of transmitting one or more images to a terminal, according to an exemplary embodiment;

FIGS. 10A, 10B and 10C are views for describing a method, performed by a device, of transmitting one or more images to a terminal, according to another exemplary embodiment;

DETAILED DESCRIPTION

Figure 1:
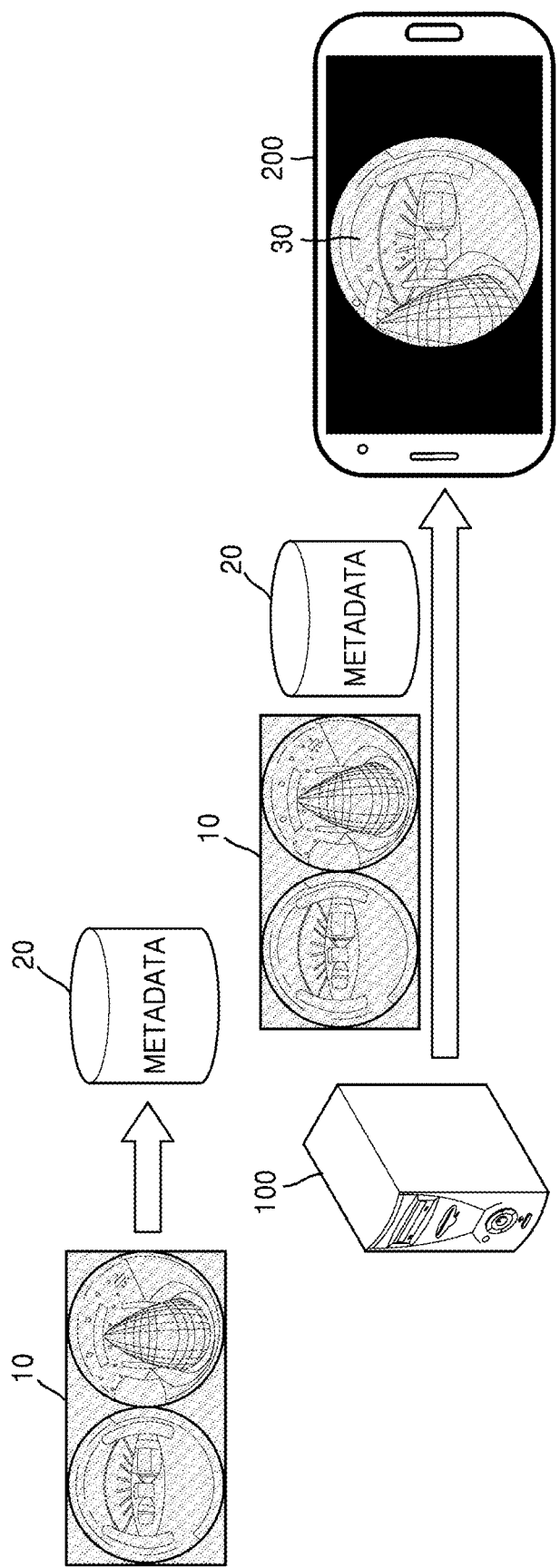
FIG. 1 is a conceptual view for describing a method of processing an image, by a device and a terminal, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of at least one of the associated listed items. Expressions such as "at least one of," when preceding a list of elements, modify the entire list of elements and do not modify the individual elements of the list.

Terms used herein will be described in brief, and the present disclosure will be described in detail.

Although terms used in the present disclosure are selected according to general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the present disclosure, if it is assumed that a certain part includes a certain component, the term 'including' means that a corresponding component may further include other components unless a specific meaning opposed to the corresponding component is written. Terms used in the exemplary embodiments, such as "unit" or "module", indicate a unit for processing at least one function or operation, and may be implemented in hardware, software, or in a combination of hardware and software.

Hereinafter, exemplary embodiments of the present disclosure will be described in detail with reference to the attached drawings to allow those of ordinary skill in the art to easily carry out the exemplary embodiments. However, the present disclosure may be implemented in various forms, and are not limited to the exemplary embodiments described herein. To clearly describe the present disclosure, parts that are not associated with the description have been omitted from the drawings, and throughout the specification, identical reference numerals refer to identical parts.

FIG. 1 is a conceptual view for describing a method of processing one or more images 10, by a device 100 and a terminal 200, according to an exemplary embodiment.

The device 100 according to an exemplary embodiment obtains the one or more images 10 of objects included in a target space. Herein, the target space is a place of a specific environment or a place where a specific situation occurs, and may be a space to be implemented with a virtual reality (VR) image. The one or more images may be real images or graphic images. However, this is merely an example, and the one or more images may be a combination of a real image and a graphic image.

Objects included in the target space may include at least one of a region included in the target space and an object and a person located in the target space. For example, if the target space is an exhibition, a wall in the exhibition and at least one exhibit may be included in objects included in the exhibition. As another example, if the target space is a stadium, images of facilities and persons located in the stadium may be included in objects included in the stadium.

The device 100 according to an exemplary embodiment generates metadata 20 used to generate a VR image of the target space based on the obtained one or more images 10.

For example, the metadata 20 may include information about mapping between a three-dimensional (3D) mesh model used to generate the VR image of the target space and the one or more images 10. The information about the mapping may include, but is not limited to, information about at least one of angles at which the one or more images 10 are captured, positions of capturing devices that capture the one or more images 10, and a type and a resolution of the 3D mesh model.

In another example, the metadata 20 may further include at least one of quality correction information for the one or more images 10, and weight information for a region on which an object overlapping between the one or more images is expressed. Herein, the quality correction information may include a lens shading correction parameter, a white balancing parameter, and so forth. The weight information may indicate a weight value for blending pixel values of pixels included in the overlapping object between the one or more images. For example, an object may be described as overlapping between two images when at least a portion of the object is captured in each of the two images.

The device 100 according to an exemplary embodiment transmits the one or more images 10 and the metadata 20 to the terminal 200. For example, as the device 100 receives a user input requesting the VR image of the target space from the terminal 200, the device 100 may transmit the one or more images 10 and the metadata 20 to the terminal 200.

The device 100 according to an exemplary embodiment transmits the metadata, which is information required for performing rendering, to the terminal 200 together with the at least one image 10, without directly generating the VR image based on the one or more images 10, thereby preventing quality degradation from occurring due to warping or the like.

The terminal 200 according to an exemplary embodiment receives the one or more images 10, which are or may include captured images of objects included in the target space, and the metadata 20 from the device 100.

The device 200 according to an exemplary embodiment generates a VR image 30 of the target space based on the received one or more images 10 and the received metadata 20. For example, the terminal 200 may obtain mapping information about mapping between a 3D mesh model used to generate the VR image 30 of the target space and the one or more images 10 from the metadata 20. The terminal 200 generates the VR image 30 by rendering the one or more images 10 based on the obtained mapping information.

The terminal 200 according to an exemplary embodiment outputs the generated VR image 30. According to another exemplary embodiment, the terminal 200 transmits the generated VR image 30 to another external terminal.

The terminal 200 according to an exemplary embodiment may be implemented in various forms. For example, the terminal 200 described herein may be, but is not limited to, a cellular phone, a smart phone, a laptop computer, a tablet personal computer (PC), an electronic-book (e-book) terminal, a digital broadcasting terminal, a personal digital assistant (PDA), a portable multimedia player (PMP), a navigation system, a smart television (TV), a consumer electronics (CE) device (e.g., a refrigerator or an air conditioner having a display panel, etc.), a head mounted display (HMD), or the like.

Figure 2:
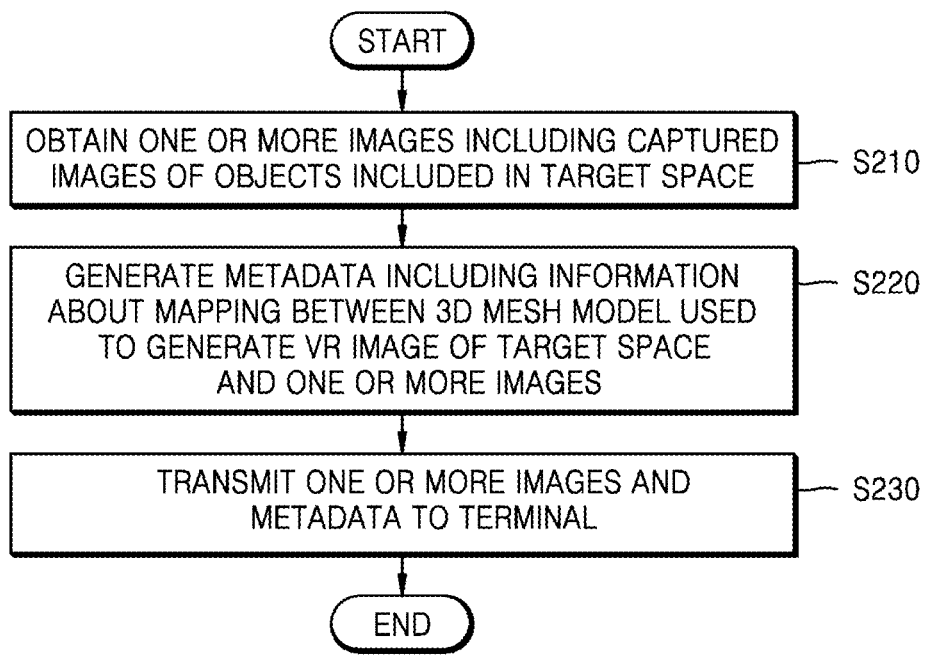
FIG. 2 is a flowchart of a method, performed by a device, of processing an image, according to an exemplary embodiment.

FIG. 2 is a flowchart of a method, performed by the device 100, of processing an image, according to an exemplary embodiment.

In operation S210, the device 100 obtains one or more images, which are or may include captured images of objects included in the target space.

For example, the device 100 may obtain the one or more images 10 from an external capturing device. In another example, the device 100 obtains the one or more images 10 by capturing the objects included in the target space using a camera included in the device 100.

In operation S220, the device 100 generates metadata including information about mapping between a 3D mesh model used to generate the VR image of the target space and the one or more images 10.

The device 100 according to an exemplary embodiment determines a type or resolution of the 3D mesh model used to generate the VR image of the target space. The device 100 determines positions of one or more images mapped onto the 3D mesh model based on the 3D mesh model of the determined type or resolution. For example, the device 100 determines positions of one or more images mapped onto the 3D mesh model, based on information about angles at which the one or more images are captured, positions of capturing devices that capture the one or more images, and so forth.

In another example, the metadata generated by the device 100 may further include quality correction information of the one or more images. For example, the quality correction information may include a lens shading correction parameter, a white balancing parameter, and so forth.

In another example, the metadata generated by the device 100 may further include weight information of the one or more images. The weight information may indicate a weight value for blending pixel values of pixels in a region which includes an object overlapping between the one or more images.

In operation S230, the device 100 transmits the one or more images and the metadata to the terminal 200.

The device 100 according to an exemplary embodiment encodes and transmits the one or more images and the metadata to the terminal 200.

According to another exemplary embodiment, the device 100 performs a process of correcting the quality of the one or more images, encodes the quality-corrected one or more images and metadata, and transmits the encoded one or more images and metadata to the terminal 200.

According to another exemplary embodiment, the device 100 combines pixel values of a region of the one or more images which includes the overlapping object according to a preset weight value for conversion. The device 100 according to an exemplary embodiment encodes and transmits the converted one or more images and the metadata to the terminal 200.

According to another exemplary embodiment, the device 100 encodes an image, which is generated as a result of performing the process of correcting the quality of the one or more images and a process of converting the pixel values of the region of the one or more images including the overlapping object according to a preset weight value, and the metadata, and transmits the encoded image and metadata to the terminal 200.

According to another exemplary embodiment, after performing the process of correcting the quality of the one or more images, the device 100 may encode a new image, which is obtained by newly projecting the quality-corrected one or more images using a normalized camera pose, and metadata updated based on a camera pose indicated by existing metadata or metadata in which a mapping data item is updated based on the normalized camera pose, and transmits the encoded image and metadata to the terminal 200. The normalized camera pose may be, for example, that a position of each camera is the same as before, and only angle information is 360 degrees for equal division of a space.

According to another exemplary embodiment, after performing a process of combining pixel values of a region of the one or more images including the overlapping object according to a preset weight value for conversion, the device 100 may encode a new image, which is obtained by newly projecting the converted one or more images with a normalized camera pose, and metadata updated based on a camera pose of existing metadata or metadata in which a mapping data item is updated based on the normalized camera pose, and transmits the encoded image and metadata to the terminal 200. The normalized camera pose may be, for example, that a position of each camera is the same as before, and only angle information is 360 degrees for equal distribution of a space.

According to another exemplary embodiment, after performing the process of correcting the quality of the one or more images and performing the process of combining pixel values of a region of the one or more images including the overlapping object according to a preset weight value for conversion, the device 100 may encode a new image, which is obtained by newly projecting the converted one or more images with a normalized camera pose, and metadata updated based on a camera pose of existing metadata or metadata in which a mapping data item is updated based on the normalized camera pose, and transmits the encoded image and metadata to the terminal 200. The normalized camera pose may be, for example, that a position of each camera is the same as before, and only angle information is 360 degrees for equal distribution of a space.

FIGS. 3A through 3D are views for describing example arrangements and forms of photographing devices for obtaining one or more images of a target space, according to an exemplary embodiment.

A capturing device according to an exemplary embodiment may exist independently outside the device 100 described with reference to FIG. 1, or may exist as a part of hardware units of the device 100. Herein, the capturing device may be, for example, a camera. The device 100, according to an exemplary embodiment, may obtain a capturing parameter regarding arrangement and capturing angles of capturing devices, together with the one or more images. The device 100 determines positions at which the pixel values of the one or more images are mapped onto the 3D mesh model, based on the obtained capturing parameter. Thus, the device 100 generates mapping information required for generating the VR image without being limited to arrangements and capturing angles of the capturing devices.

Figure 3A:
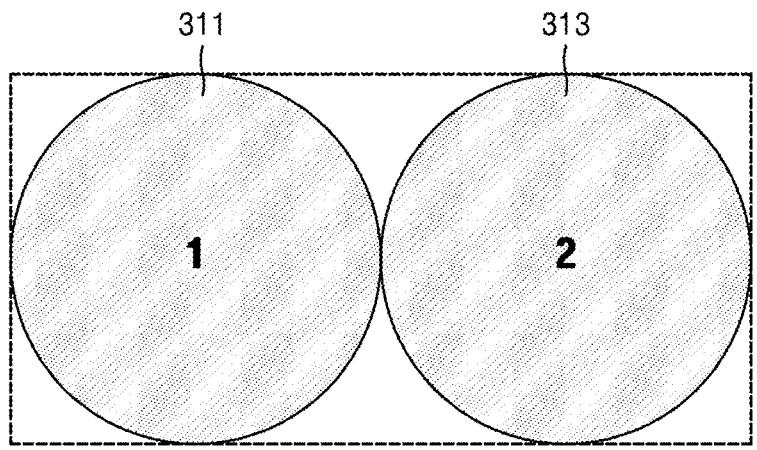
FIGS. 3A, 3B, 3C and 3D are views for describing arrangements and forms of photographing devices for obtaining one or more images of a target space, according to an exemplary embodiment.

Referring to FIG. 3A, an exemplary embodiment is shown in which two capturing devices capture images of objects included in a target space, respectively. For example, a first capturing device 311 may capture objects included in a target space from a perspective which spans from 0 degrees to 200 degrees with respect to a preset reference point, and a second capturing device 313 may capture objects included in the target space from a perspective which spans from 180 degrees to 380 degrees (corresponding to 20 degrees) with respect to the preset reference point.

Figure 3B:
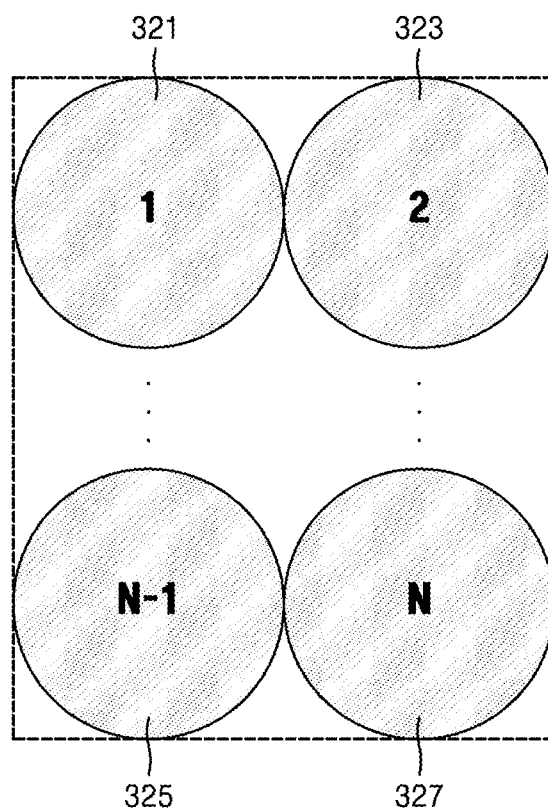

Referring to FIG. 3B, an exemplary embodiment is shown in which N capturing devices 321, 323, 325, and 327 capture images of objects included in the target space, respectively. For example, N capturing devices 321, 323, 325, and 327 capture images of objects included in N regions of the target space, respectively. Herein, N capturing devices 321, 323, 325, and 327 capture images, respectively, such that some objects overlap each other. The images captured by the N capturing devices 321, 323, 325, and 327, respectively, may be generated as a VR image capable of expressing a 360-degree region of the target space through stitching.

Figure 3C:
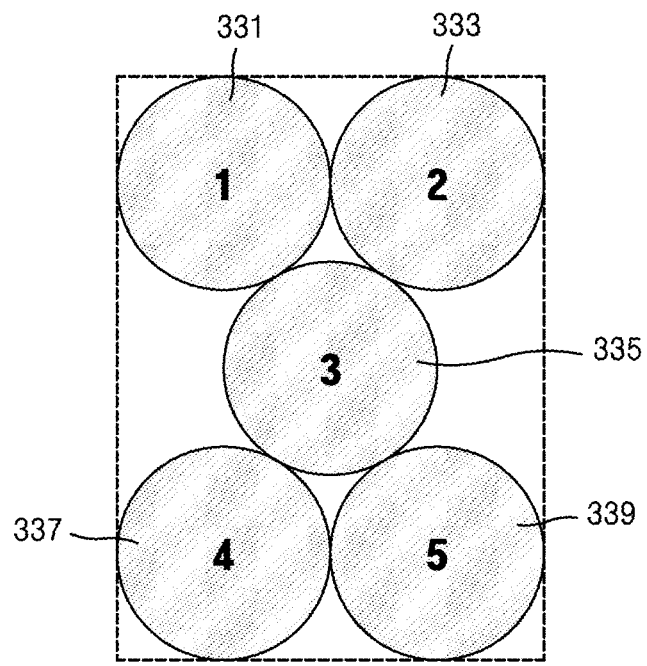

Referring to FIG. 3C, an exemplary embodiment is shown in which an arrangement of a plurality of first through fifth capturing devices 331, 333, 335, 337, and 339 may be changed in a range capable of obtaining an image of all objects existing in the target space. For example, by combining images captured by the first capturing device 331, the second capturing device 333, the third capturing device 335, the fourth capturing device 337, and the fifth capturing device 339, respectively, the image of all the objects existing in the 360-degree region of the target space may be obtained.

Figure 3D:
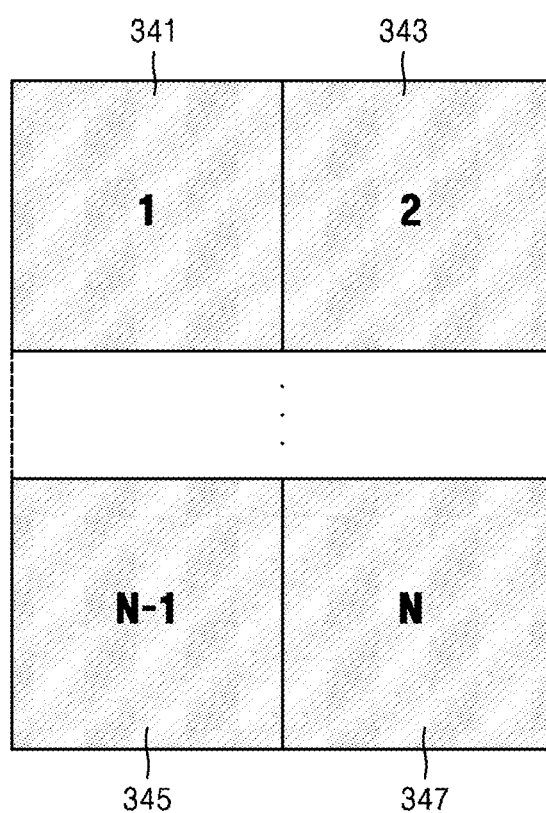

Referring to FIG. 3D, an exemplary embodiment is shown in which capturing devices 341, 343, 345, and 347 may be rectangular cameras, or cameras which are capable of capturing rectilinear images. The capturing device according to an exemplary embodiment may have various forms in a range that does not distort a structure of an obtained image, and the obtained image may have various angles such as a wide angle, a narrow angle, or the like.

The device 100 according to an exemplary embodiment determines mapping between a 3D mesh model for generating a VR image and one or more images based on information about capturing angles of images obtained by capturing objects of the target space, positions of the capturing devices, and so forth.

Figure 4:
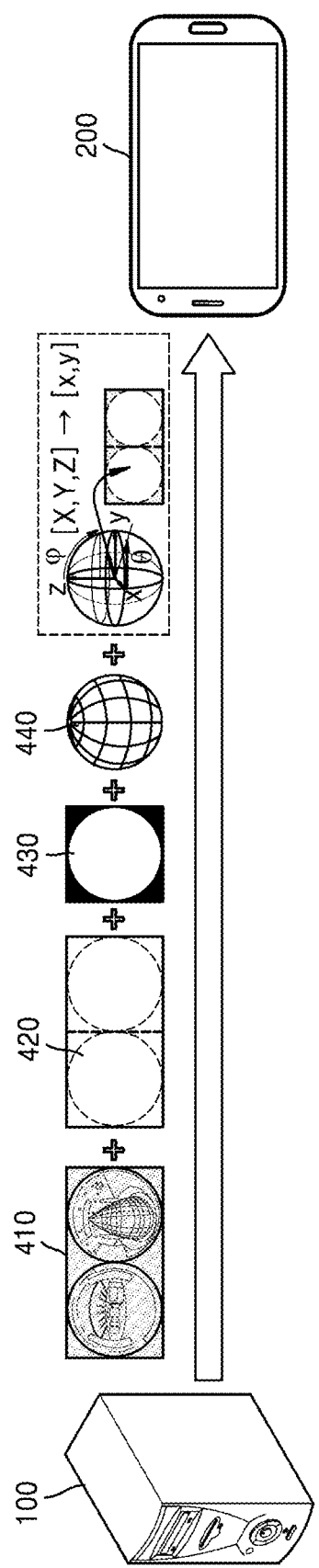
FIG. 4 is a view for describing one or more images and metadata transmitted from a device to a terminal, according to an exemplary embodiment.

FIG. 4 is a view for describing one or more images and metadata transmitted from the device 100 to the terminal 200, according to an exemplary embodiment.

The device 100 according to an exemplary embodiment obtains one or more images 410 which are or may include captured images of objects included in a target space. The device 100 according to an exemplary embodiment generates metadata which may be used to generate a VR image of the target space based on the obtained one or more images 410.

According to an exemplary embodiment, the metadata generated by the device 100 may include quality correction information 420, weight information 430, 3D mesh model information 440, and mapping information 450.

For example, the device 100 may determine the quality correction information 420 including a lens shading correction parameter, a white balancing parameter, etc., for noise cancellation and quality improvement for the one or more images 410.

The device 100 identifies an overlapping object in case of stitching of the one or more images 410, according to an exemplary embodiment. For example, the device 100 may identify an object overlapping between a first image, which is a captured image of a first region of the target space, and a second image, which is a captured image of a second region of the target space. The device 100 determines pixel values of the overlapping object between the first image and the second image, based on a weight value w1 for a pixel value of the first image and a weight value w2 for a pixel value of the second image. The weight information may exist in the form of a blending mask.

The device 100 determines 3D mesh model information 440, which is a basis of rendering the one or more images 410 into a 360-degree VR image of the target space, according to an exemplary embodiment. For example, the 3D mesh model information 440 may include information about a form and a resolution of the 3D mesh model, and so forth.

The device 100 determines mapping information 450 indicating mapping between the one or more images 410 and the 3D mesh model, according to an exemplary embodiment. The mapping information 450 may include information about positions at which pixels included in the one or more images 410 are mapped onto the 3D mesh model.

According to an exemplary embodiment, the device 100 transmits metadata including quality correction information 420, weight information 430, the 3D mesh model information 440, and the mapping information 450 to the terminal 200. The terminal 200 renders the VR image of the target space from the one or more images 410 based on the metadata received from the device 100.

Figure 5:
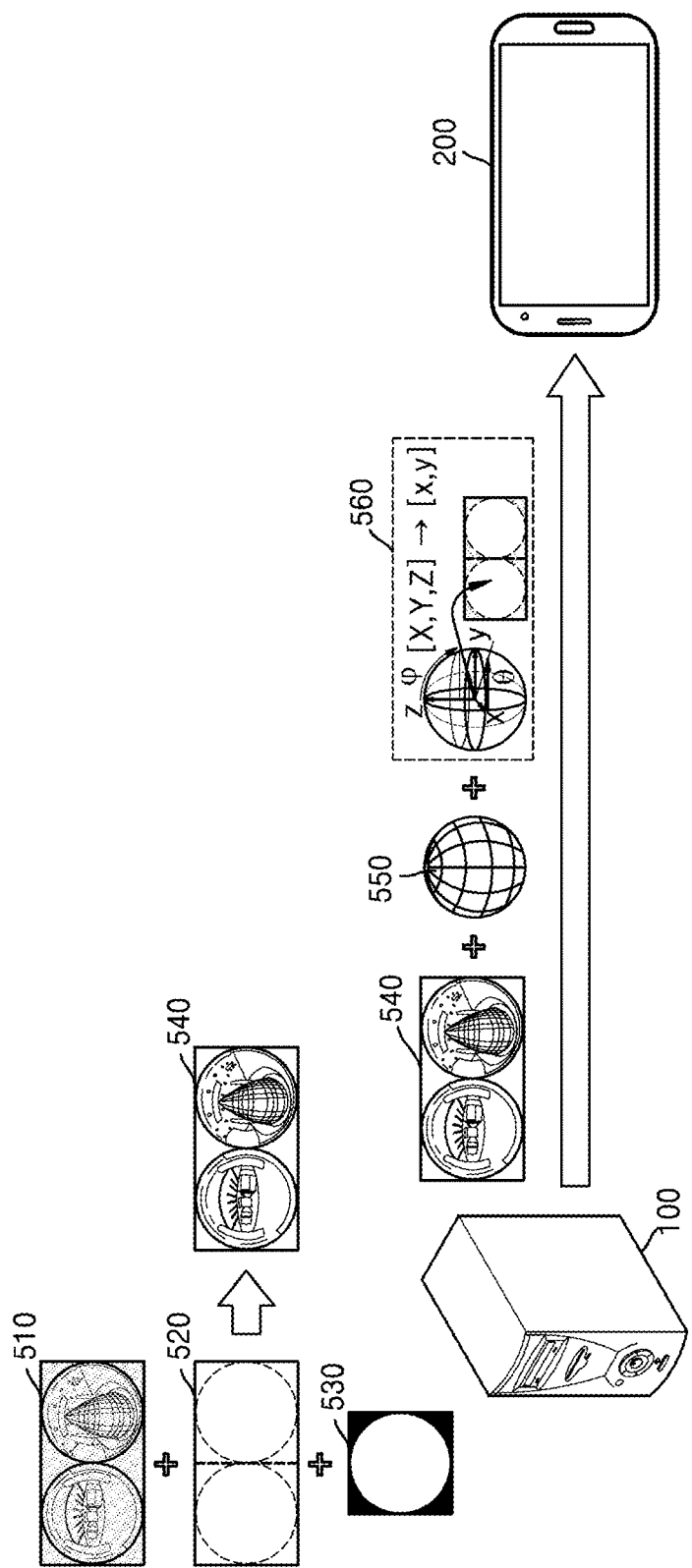
FIG. 5 is a view for describing one or more images and metadata transmitted from a device to a terminal, according to another exemplary embodiment.

FIG. 5 is a view for describing one or more images and metadata transmitted from the device 100 to the terminal 200, according to another exemplary embodiment.

The device 100 according to an exemplary embodiment obtains one or more images 510 which are or may include captured images of objects included in a target space. The device 100 according to an exemplary embodiment generates metadata which may be used to generate a VR image of the target space based on the obtained one or more images 510. For example, the metadata may include quality correction information 520, weight information 530, 3D mesh model information 550, and mapping information 560.

The device 100 according to an exemplary embodiment performs some of a plurality of processes that may be performed to generate the VR image of the target space from the one or more images 510. The device 100 transmits information which may be used to perform other processes to the terminal 200 together with the one or more images which have undergone the some processes, as the metadata.

Referring to FIG. 5, the device 100 performs a process of correcting the quality of the one or more images 510 based on the quality correction information 520. For example, the device 100 may correct noise of a pixel value of the one or more images 510, caused by lens shading, or adjust white balancing of the pixel value.

The device 100 may convert pixel values of an overlapping object which overlaps between the one or more images by applying the weight information 530 to the quality-corrected one or more images.

The device 100 according to an exemplary embodiment transmits one or more images 540, which has undergone the quality correction process and the weight information application process, to the terminal 200 together with metadata including the 3D mesh model information 550 and the mapping information 560.

The device 100 according to an exemplary embodiment performs some processes and then transmits results to the terminal 200, thereby reducing the amount of computation of the terminal 200 and reducing distortion occurring when the device 100 performs all of the processes.

Figure 6A:
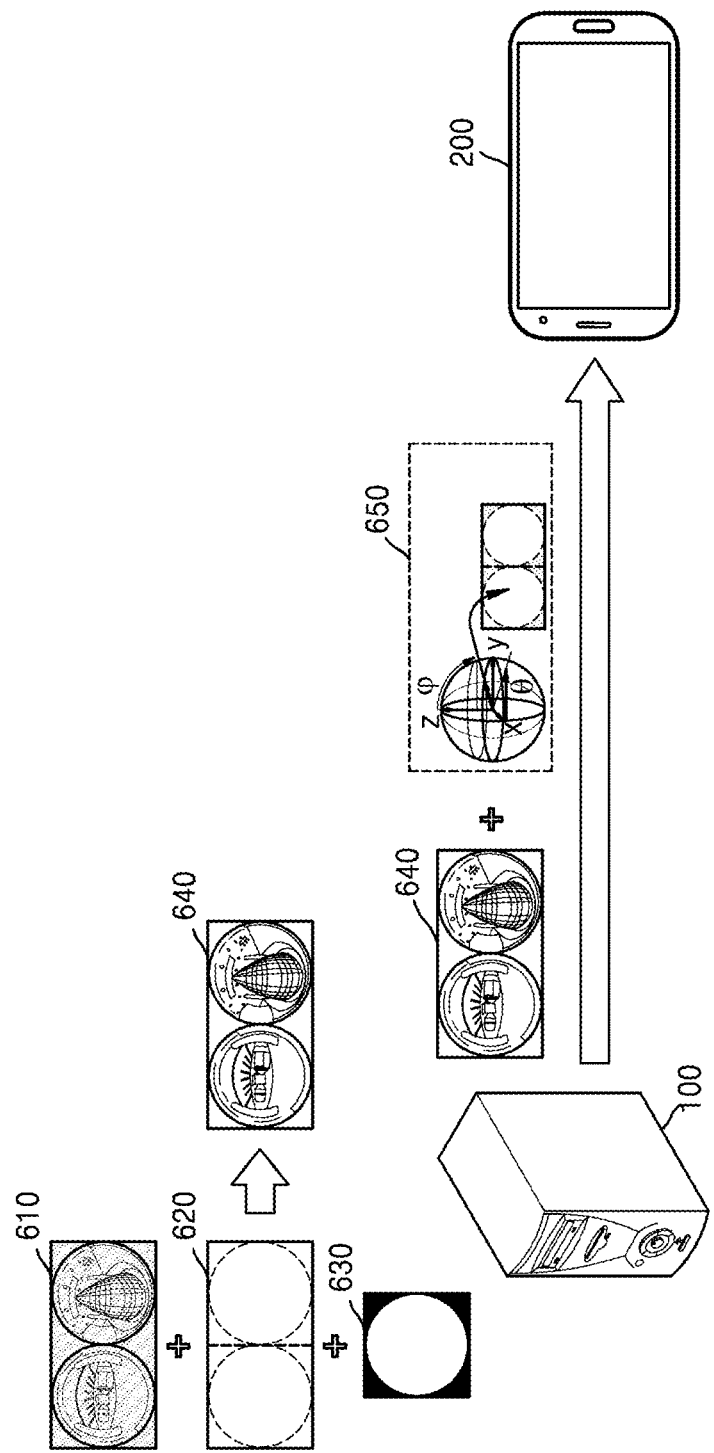
FIGS. 6A, 6B and 6C are views for describing one or more images and metadata transmitted from a device to a terminal, according to another exemplary embodiment.

FIG. 6A is a view for describing one or more images and metadata transmitted from the device 100 to the terminal 200, according to another exemplary embodiment.

The device 100 according to an exemplary embodiment obtains one or more images 610 which are or may include captured images of objects included in a target space. The device 100 according to an exemplary embodiment generates metadata which may be used to generate a VR image of the target space based on the obtained one or more images 610. For example, the metadata may include quality correction information 620, weight information 630, and 3D mesh model and mapping information 650. However, this is merely an example, and when 3D mesh model information is previously set between the device 100 and the terminal 200, the 3D mesh model information may be not included in the metadata.

The device 100 according to an exemplary embodiment performs some of a plurality of processes that may be performed to generate the VR image of the target space from the one or more images 610. The device 100 transmits information which may be used to perform the other processes to the terminal 200 together with the one or more images which have undergone the some processes, as the metadata.

Referring to FIG. 6A, the device 100 performs a process of correcting the quality of the one or more images 610 based on the quality correction information 620. For example, the device 100 may correct noise of a pixel value of the one or more images 610, caused by lens shading, or adjust white balancing of the pixel value.

The device 100 may convert pixel values of an overlapping object which overlaps between the one or more images by applying the weight information 630 to the quality-corrected one or more images.

The device 100 according to an exemplary embodiment transmits one or more images 640, which have undergone the quality correction process and the weight information application process, to the terminal 200 together with the metadata including the mapping information 650. Herein, the mapping information 650 may include information about positions at which pixels included in the one or more images 640 are mapped onto the 3D mesh model. In FIG. 6A, it is assumed that the 3D mesh model information is previously stored or made as a parameter, in order to be generated by any terminal without detailed information.

The device 100 according to an exemplary embodiment performs some processes and then transmits results to the terminal 200, thereby reducing the amount of computation of the terminal 200 and reducing distortion occurring when the device 100 performs all of the processes.

Figure 6B:
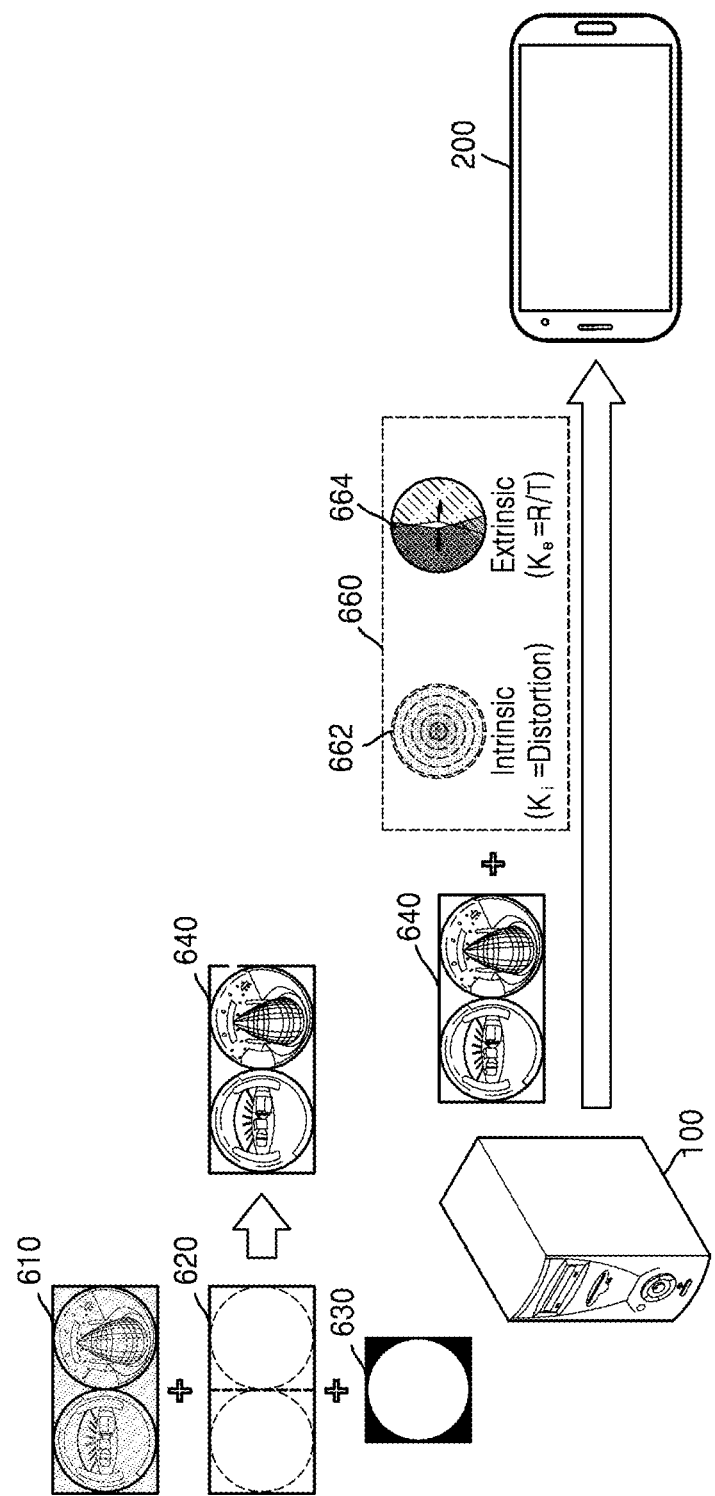

FIG. 6B is a view for describing one or more images and metadata transmitted from the device 100 to the terminal 200, according to another exemplary embodiment. The exemplary embodiment shown in FIG. 6B is similar with that shown in FIG. 6A, except that mapping information is replaced with information 660 available for calculation of metadata without being directly stored in the metadata. For example, as shown in FIG. 6B, position information 662 and angle information 664 of a camera may be included in information 660 available for calculation of metadata. However, this is merely an example, and the information 660 available for calculation of the metadata is not limited to this example.

Figure 6C:
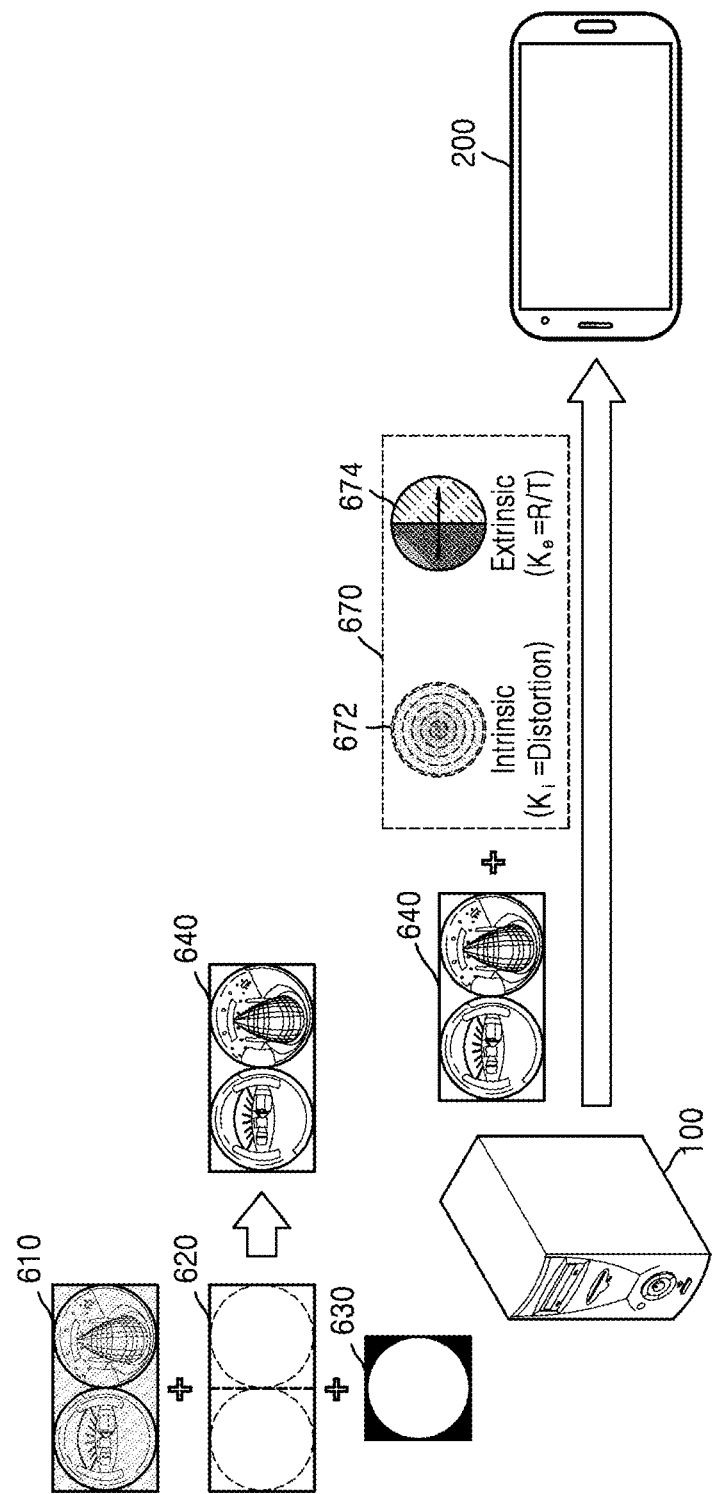

FIG. 6C is a view for describing one or more images and metadata transmitted from the device 100 to the terminal 200, according to another exemplary embodiment. The exemplary embodiment shown in FIG. 6C is similar with that shown in FIG. 6C, except that after correcting noise of a pixel value, caused by lens shading, adjusting white balancing, or adjusting pixel values of an overlapping object using weight information, the device 100 converts the result image into a new image by newly projecting the image using a normalized camera pose. Camera pose or mapping data information included in the metadata transmitted to the terminal 200 may be converted based on normalized camera pose information 670. Herein, the normalized camera pose information 670 indicates a pose of a camera arranged such that a capturing angle at an identical position 672 corresponds to an angle 674 obtained by equally dividing a 360-degree space.

Meanwhile, some processes performed by the device 100 and information included in metadata transmitted to the terminal 200 are not limited to examples described above with reference to FIGS. 4 through 6C.

Figure 7A:
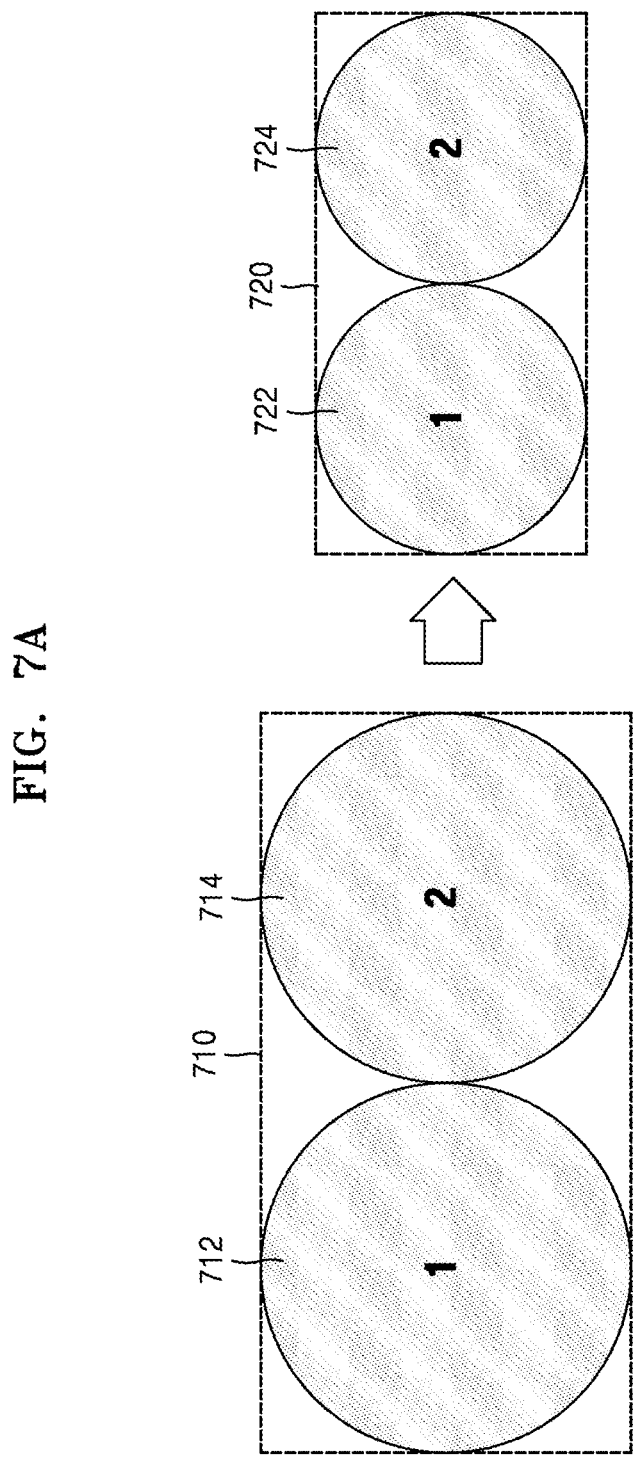
Figure 7C:
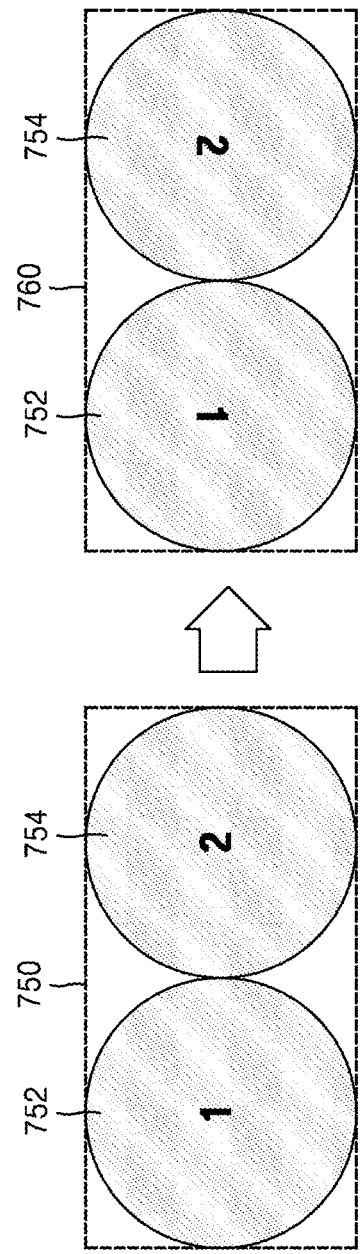

FIGS. 7A through 7C are flow diagrams illustrating a method, performed by the device 100, of transmitting one or more images to a terminal, according to an exemplary embodiment.

The device 100 according to an exemplary embodiment may edit one or more images transmitted to the terminal 200. For example, the device 100 may change the size and arrangement of the one or more images while maintaining the form of the one or more images.

Referring to an exemplary embodiment shown in FIG. 7A, the device 100 may reduce the size of one or more images 710 including a first image 712 and a second image 714. The device 100 transmits one or more images 720 including a size-reduced first image 722 and a size-reduced second image 724 to the terminal 200 together with metadata.

Referring to an exemplary embodiment shown in FIG. 7B, the device 100 crops a region of one or more images 730 including a first image 732 and a second image 734. If some objects included in the first image 732 and the second image 734 overlap, the device 100 according to an exemplary embodiment crops a region of the first image 732 and a region of the second image 732 where the overlapping object is expressed. For example, if the first image 732 is a captured image of objects existing in a region which spans from 0 degrees to 230 degree of the target space and the second image 734 is a captured image of objects existing in a region which spans from 180 degrees to 410 degrees of the target space, the device 100 may crop regions of images which include objects existing in a region which spans from 180 degrees to 230 degrees in the first image 732 and objects existing in a region which spans from 360 degrees to 410 degrees in the second image 734.

Referring to FIG. 7C, the device 100 may change an arrangement of one or more images 750 including a first image 752 and a second image 754. For example, the device 100 may change an arrangement of the first image 752 and the second image 754 in at least one of up, down, left, or right directions. The device 100 according to an exemplary embodiment transmits the arrangement-changed one or more images 760 to the terminal 200 together with the metadata.

The device 100 according to an exemplary embodiment may reduce the amount of data to be transmitted to the terminal 200 from the device 100, by editing and transmitting the one or more images to the terminal 200.

Figure 8:
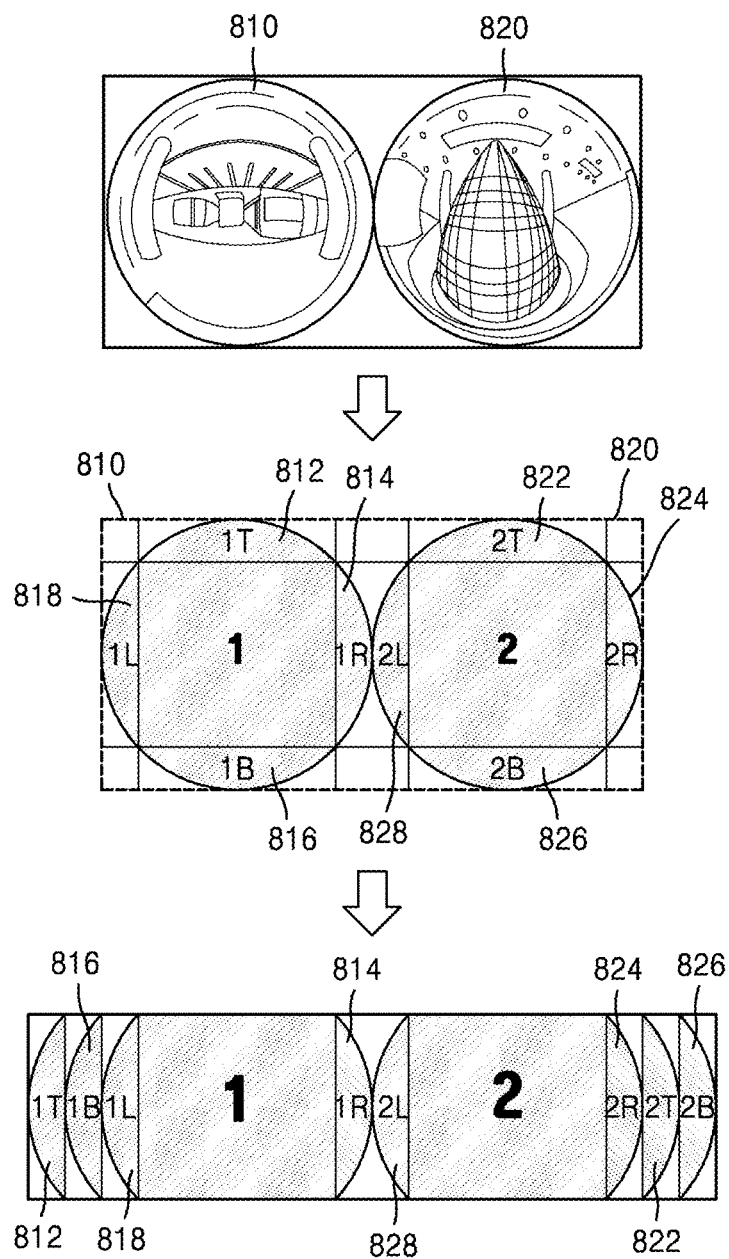
FIG. 8 is a flow diagram illustrating a method, performed by a device, of transmitting one or more images to a terminal, according to another exemplary embodiment.

FIG. 8 is a flow diagram illustrating a method, performed by the device 100, of transmitting one or more images 810 and 820 to the terminal 200, according to another exemplary embodiment.

The device 100 according to an exemplary embodiment may edit one or more images transmitted to the terminal 200. Herein, the device 100 edits one or more images obtained from the camera or one or more images that have undergone the quality correction process or the blending process.

Referring to FIG. 8, the device 100 transmits a first image 810 and a second image 820 to the terminal 200 to render the VR image of the target space in the terminal 200. The device 100 according to an exemplary embodiment edits the first image 810 and the second image 820 to reduce the amount of data transmitted to the terminal 200.

For example, the device 100 may crop a portion of the first image 810 and a portion of the second image 820 and arrange a cropped region in another position to minimize a margin area generated due to circular shapes of the first image 810 and the second image 820. The device 100 crops a first upper region 812, a first right region 814, a first lower region 816, and a first left region 818 of the first image 810 and arranges the cropped regions in other positions. The device 100 crops a second upper region 822, a second right region 824, a second lower region 826, and a second left region 828 of the second image 820 and arranges the cropped regions in other positions.

The positions in FIG. 8 at which the cropped regions 812, 814, 816, 818, 822, 824, 826, and 828 are merely examples, and the device 100 may arrange the cropped regions 812, 814, 816, 818, 822, 824, 826, and 828 in various positions.

The device 100 according to an exemplary embodiment re-arranges a partial region of each of the first image 810 and the second image 820 to improve the coding efficiency of the one or more images 810 and 820 transmitted to the terminal 200.

Figure 9:
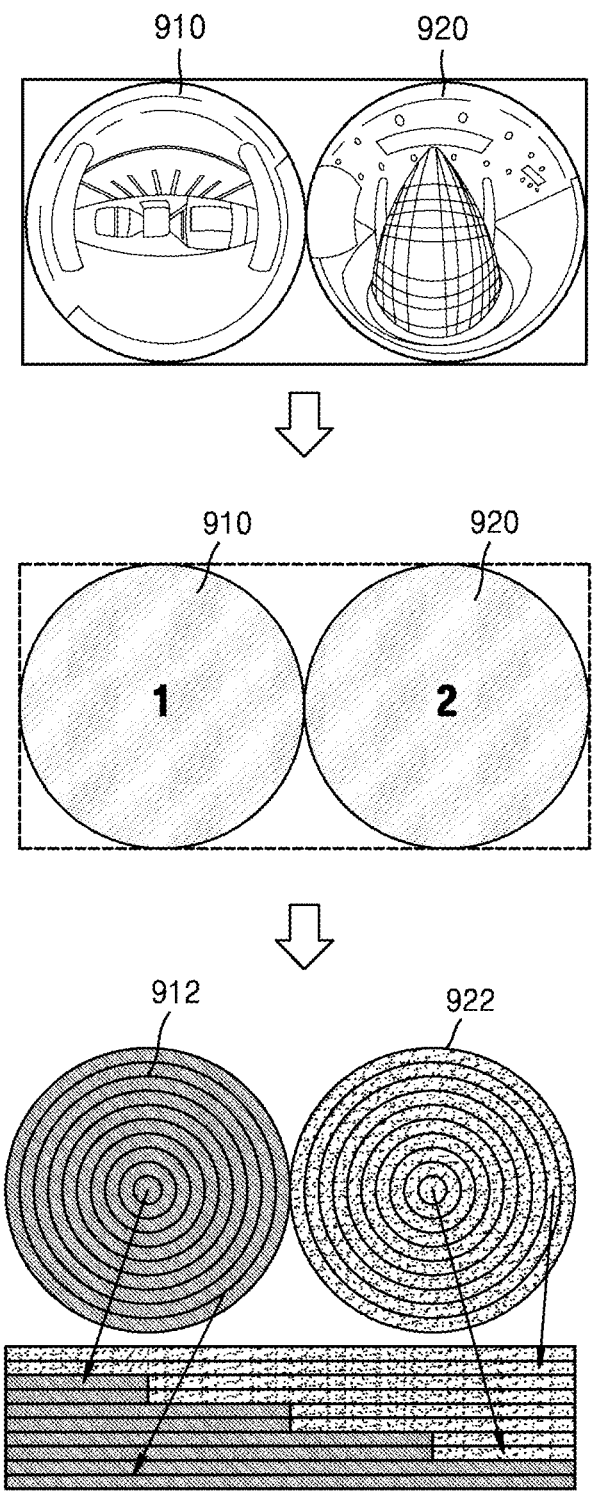
FIG. 9 is a flow diagram illustrating a method, performed by a device, of transmitting one or more images to a terminal, according to another exemplary embodiment.

FIG. 9 is a flow diagram illustrating a method, performed by the device 100, of transmitting one or more images 910 and 920 to the terminal 200, according to another exemplary embodiment.

The device 100 according to an exemplary embodiment may edit one or more images transmitted to the terminal 200. Herein, the device 100 edits one or more images obtained from the camera or one or more images that have undergone the quality correction process or the blending process.

Referring to FIG. 9, for example, to minimize a margin region generated due to circular shapes of the first image 910 and the second image 920, the device 100 may crop image regions 912 and 914 of the first image 910 and the second image 920, excluding the margin region, in the form of a band. The device 100 arranges the first image region 912 edited in a band form and the second image region 914 edited in a band form to correspond to a structure of a rectangular image.

The device 100 according to an exemplary embodiment transmits the image disposed to correspond to the structure of the rectangular image to the terminal 200. The device 100 according to an exemplary embodiment re-arranges the image regions 912 and 914 of each of the first image 910 and the second image 920 in the band form to improve the coding efficiency of one or more images transmitted to the terminal 200.

FIGS. 10A through 100 are views for describing a method, performed by the device 100, of transmitting one or more images 1010 and 1020 to the terminal 200, according to another exemplary embodiment.

The device 100 according to an exemplary embodiment may edit one or more images transmitted to the terminal 200. Herein, the device 100 edits one or more images obtained from the camera or one or more images that have undergone the quality correction process or the blending process.

Referring to FIG. 10A, a margin region having no data may exist in a first image 1010 and a second image 1020 transmitted to the terminal 200 from the device 100. First and second overlapping regions 1012 and 1022 including a photographed overlapping object may be included in the first image 1010 and the second image 1020. Regions of images including non-overlapping objects in the first image 1010 and the second image 1020 will be referred to as unique first and second image regions 1014 and 1024.

The device 100 according to an exemplary embodiment effectively arranges the overlapping regions 1012 and 1022 of the first image 1010 and the second image 1020 to minimize margin regions included in images transmitted from the device 100 to the terminal 200. Thus, the device 100 may improve the coding efficiency of a transmission image.

For example, the device 100 may determine the first overlapping region 1012 and the second overlapping region 1022 including the captured overlapping object in the first image 1010 and the second image 1020, respectively. The device 100 separates the first overlapping region 1012 and the second overlapping region 1022 in a band form, such that an image to be transmitted to the terminal 200 has a rectangular structure. Thus, a margin region of the image to be transmitted to the terminal 200 from the device 100 is reduced, increasing the coding efficiency.

Figure 10B:
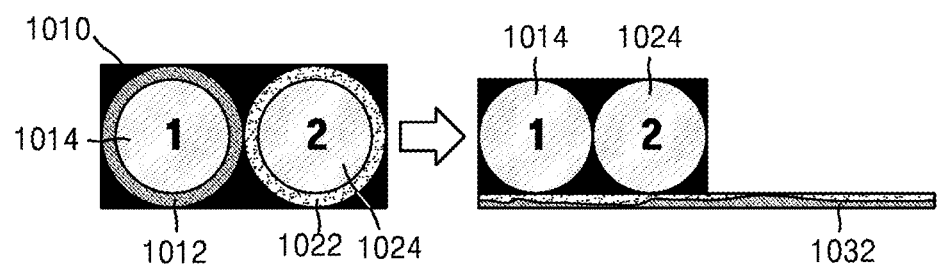
Figure 10C:
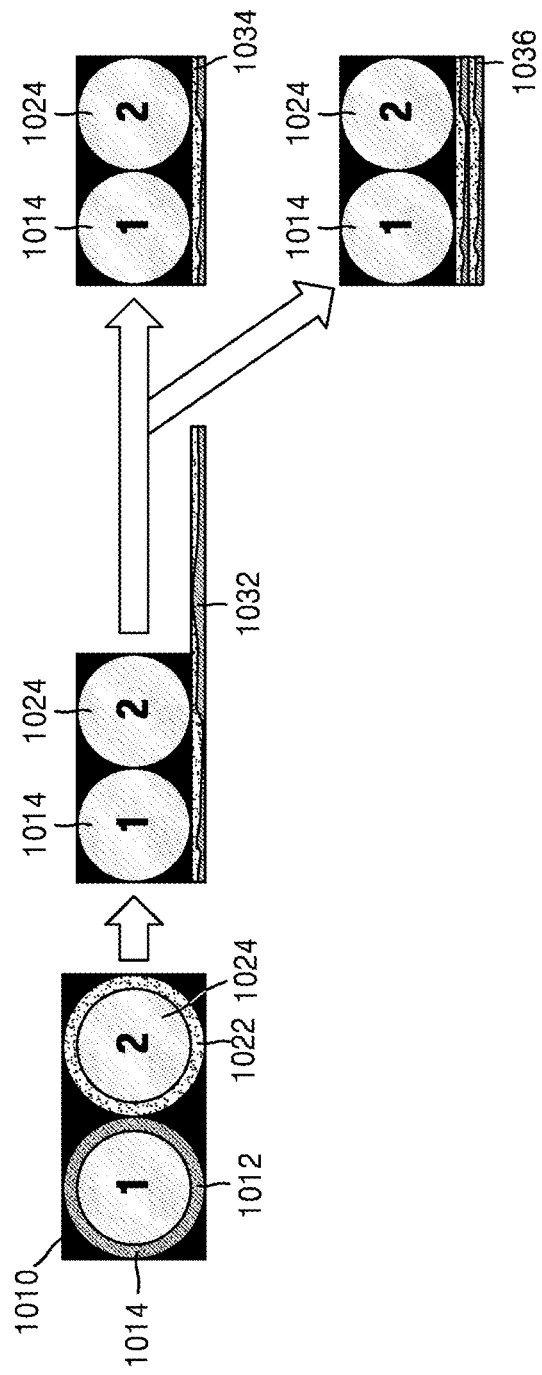

Referring to FIG. 10B, the device 100 blends the first and second regions 1012 and 1022 included in the first image 1010 and the second image 1020 according to a preset weight value. For example, the device 100 may sum pixel values of pixels included in the first overlapping region 1012 and pixel values of pixels included in the second overlapping region 1022 according to a preset weight value.

The device 100 according to an exemplary embodiment arranges a blended overlapping region 1032, the first unique image region 1014, and the second unique image region 1024 in a rectangular structure and transmits a rectangular-structure image to the terminal 200.

Referring to FIG. 100, the device 100 edits the blended overlapping region 1032 generated by blending the first and regions 1012 and 1022 included in the first image 1010 and the second image 1020 according to a preset weight value.

The device 100 according to an exemplary embodiment changes a size or arrangement of the blended overlapping region 1032. For example, the device 100 may generate a reduced overlapping region 1034 by reducing the size of the blended overlapping region 1032. According to another example, the device 100 may generate a rearranged overlapping region 1036 by rearranging a portion of the blended overlapping region 1032.

The device 100 according to an exemplary embodiment transmits a rectangular-structure image including the reduced overlapping region 1034 or the rearranged overlapping region 1036, the first unique image region 1014, and the second unique image region 1024 to the terminal 200.

Figure 11:
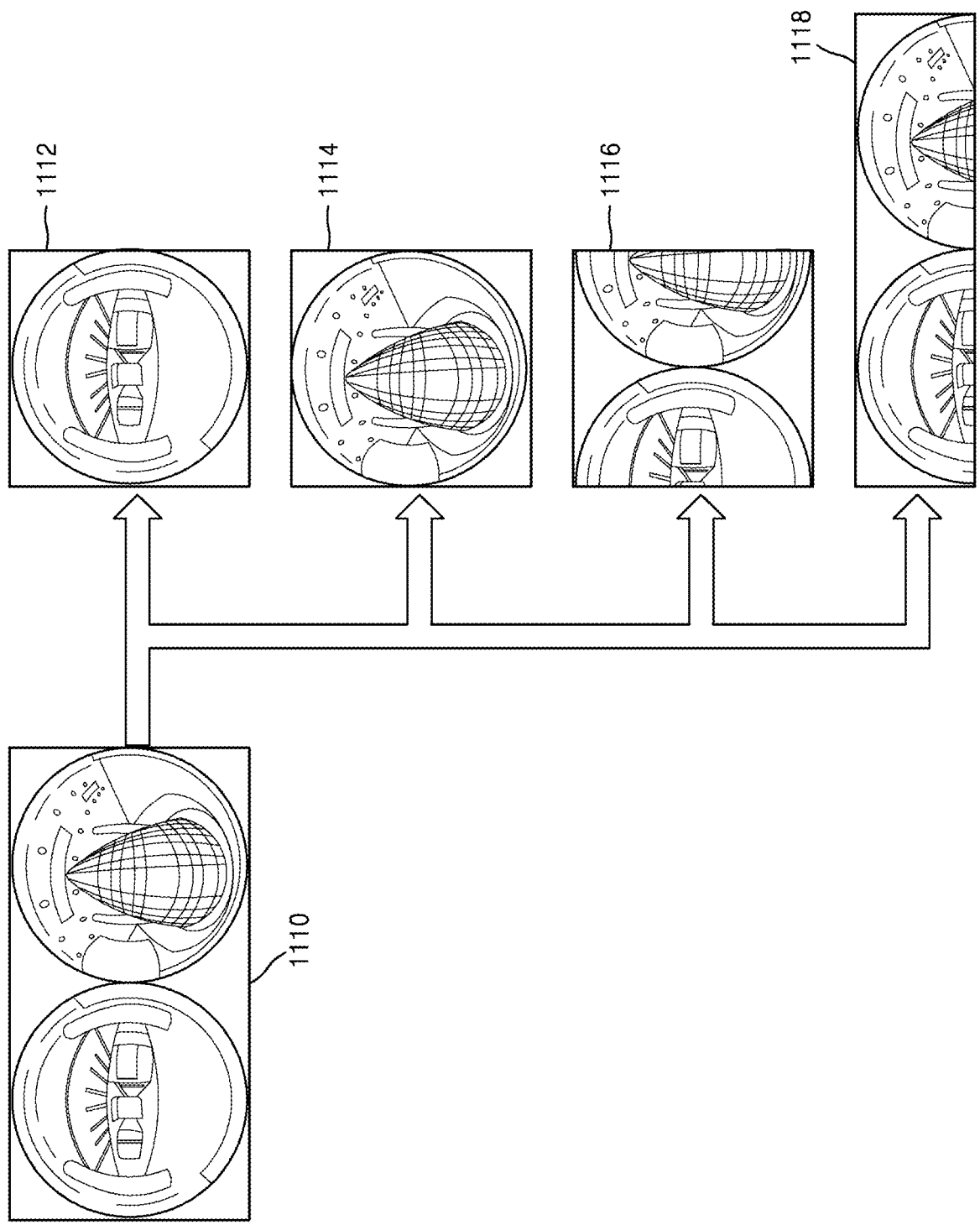
FIG. 11 is a flow diagram illustrating a method, performed by a device, of transmitting a portion of one or more images to a terminal, according to an exemplary embodiment.

FIG. 11 is a flow diagram of a method, performed by the device 100, of transmitting one or more images 1110 to the terminal 200, according to another exemplary embodiment.

The device 100 according to an exemplary embodiment selects a portion of the obtained one or more images 1110. For example, the device 100 may obtain object-of-interest information regarding an object of the target space in which the user is interested. The object-of-interest information may be generated automatically by sensing a change in a user's gaze or operation by the terminal 200 or may be generated based on a user input. The terminal 200 may transmit the generated object-of-interest information to the device 100. However, this is merely an example, and a method of selecting a portion of the obtained one or more images 1110 by the device 100 is not limited thereto.

Referring to FIG. 11, the device 100 according to an exemplary embodiment selects a first image 1112 captured by a capturing device located in a first direction from among the one or more images 1110. For example, if the device 100 receives information indicating that a user's gaze is directed in the first direction from the terminal 200, the device 100 may select the first image 1112 corresponding to the first direction from among the one or more images 1110.

In another example, the device 100 selects a second image 1114 captured by a capturing device located in a second direction from among the one or more images 1110. For example, if the device 100 receives information indicating that a user's gaze is directed in the second direction from the terminal 200, the device 100 may select the second image 1114 corresponding to the second direction from among the one or more images 1110.

However, this is merely an example, and the device 100 may select a portion from the one or more images 1110 based on the object-of-interest information obtained from the terminal 200. For example, the device 100 may select a portion 1116 including a boundary region between the first image 1112 and the second image 1114 from the one or more images 1110. In another example, the device 100 may select a portion 1118 including upper regions of the first image 1112 and the second image 1114.

The device 100 according to an exemplary embodiment transmits a selected object image and metadata regarding the selected object image to the terminal 200. According to another exemplary embodiment, the device 100 applies the above-described quality correction process or blending process to the selected object image to convert the selected object image. The device 100 according to an exemplary embodiment transmits the converted image and the metadata regarding the selected object image to the terminal 200.

The device 100 according to an exemplary embodiment determines encoding qualities differently for a region corresponding to an object of interest and a region other than the region corresponding to the object of interest in the one or more images 110, based on the object-of-interest information obtained from the terminal 200, thereby improving coding efficiency.

Figure 12:
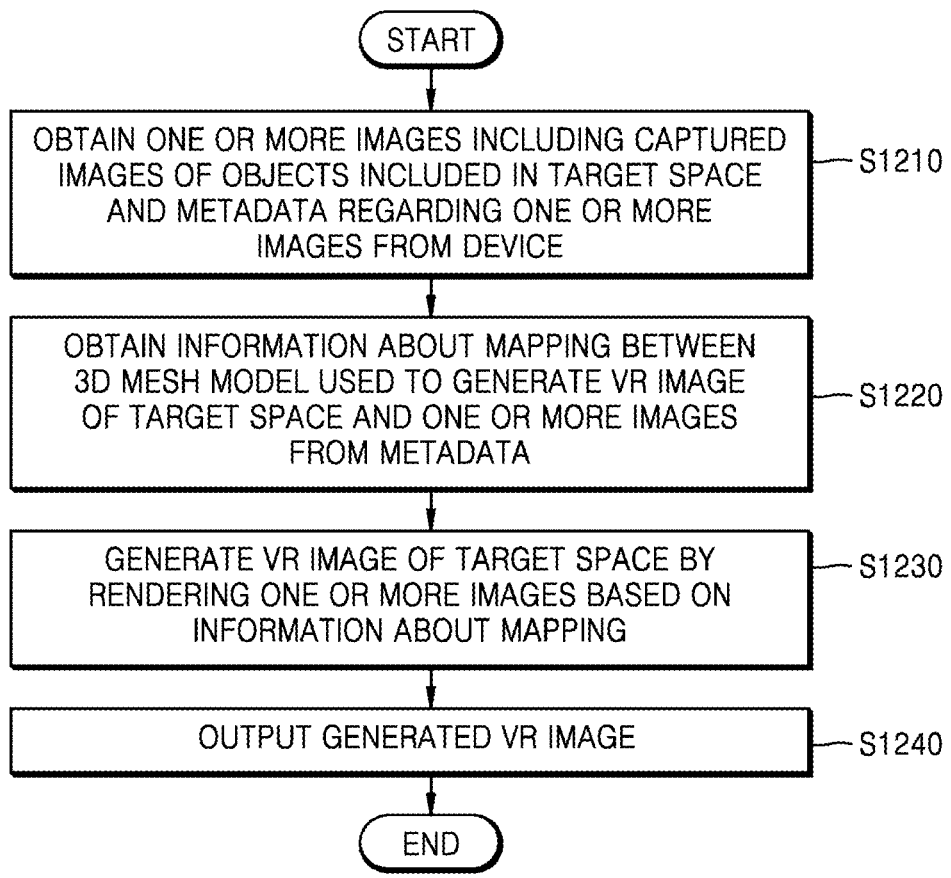
FIG. 12 is a flowchart of a method, performed by a terminal, of processing an image, according to a first exemplary embodiment.

FIG. 12 is a flowchart of a method, performed by the terminal 200, of processing an image, according to a first exemplary embodiment.

In operation S1210, the terminal 200 obtains one or more images, which are or may include captured images of objects included in the target space, and metadata regarding the one or more images from the device 100.

The terminal 200 according to an exemplary embodiment sends a request for the one or more images and the metadata regarding the one or more images to the device 100 to render a VR image of the target space. For example, if the terminal 200 receives a user input for selecting the target space from the user, the terminal 200 may send a request for the one or more images and the metadata regarding the one or more images to the device 100.

The terminal 200 according to an exemplary embodiment receives one or more images, which are or may include captured images of objects included in the target space, and metadata regarding the one or more images from the device 100 through a preset communication session. The terminal 200 receives the one or more images and the metadata regarding the one or more images on a real time basis.

The obtained one or more images may be images generated as a result of applying post-processing, such as the quality correction process and the blending process, to captured images of objects included in the target space.

In operation S1220, the terminal 200 obtains from the metadata information about mapping between the one or more images and a 3D mesh model used to generate the VR image of the target space.

The terminal 200 according to an exemplary embodiment parses the metadata to obtain the information about mapping. The information about mapping may include information about positions at which pixels included in the one or more images are mapped onto the 3D mesh model.

In operation S1230, the terminal 200 renders the one or more images based on the information about mapping to generate a VR image of the target space.

The terminal 200 according to an exemplary embodiment renders the one or more images, depending on a type of the 3D mesh model, based on the information about mapping. For example, the terminal 200 may generate the VR image of the target space by mapping the pixels included in the one or more images onto the 3D mesh model, based on the information about mapping.

The VR image may include at least one of a still image and a moving image.

In operation S1240, the terminal 200 outputs the generated VR image.

The terminal 200 according to an exemplary embodiment displays the generated VR image. According to another exemplary embodiment, the terminal 200 senses a user's gaze and outputs at least one region of the VR image, which corresponds to the sensed user's gaze. The terminal 200 is coupled to an HMD device or the like to output the generated VR image through the HMD device.

Figure 13:
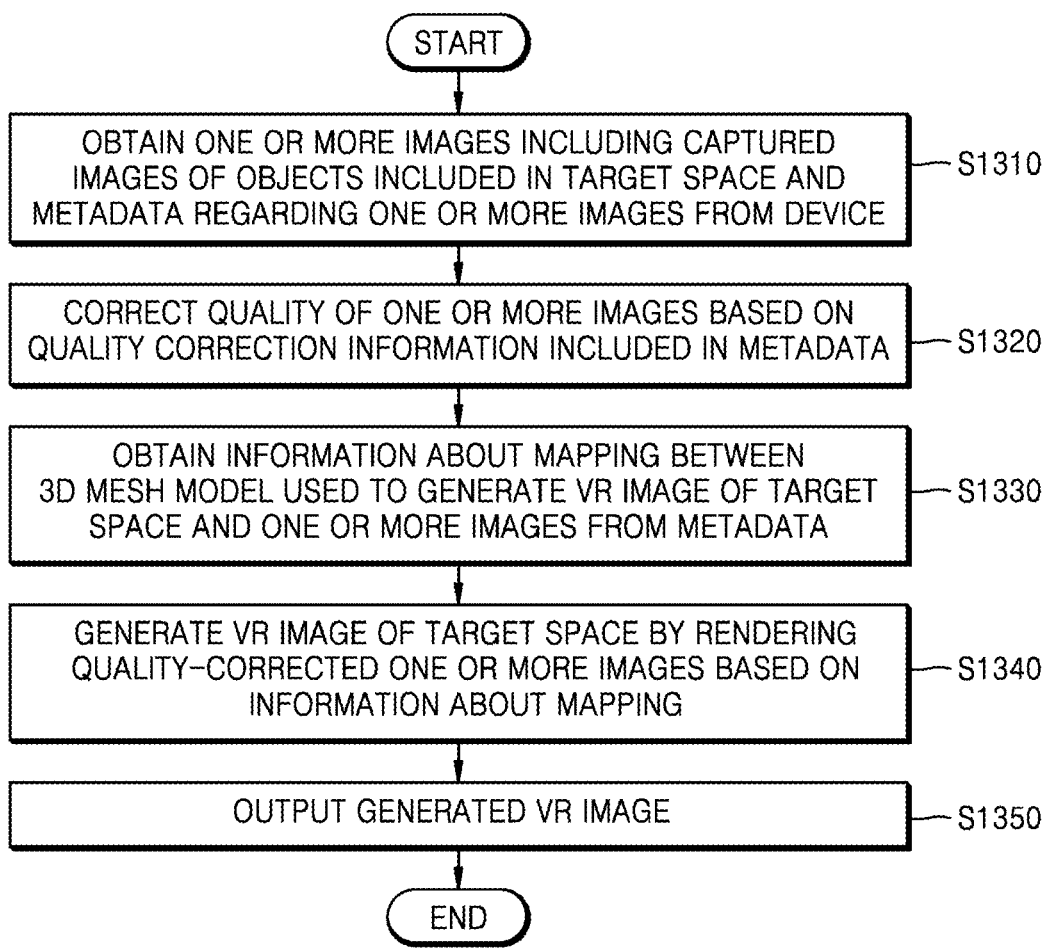
FIG. 13 is a flowchart of a method, performed by a terminal, of processing an image, according to a second exemplary embodiment.

FIG. 13 is a flowchart of a method, performed by the terminal 200, of processing an image, according to a second exemplary embodiment.

In operation S1310, the terminal 200 obtains one or more images, which are or may include captured images of objects included in the target space, and metadata regarding the one or more images from the device 100.

The obtained one or more images may be images generated as a result of applying post-processing, such as the blending process, to captured images of objects included in the target space.

In operation S1320, the terminal 200 corrects the quality of the one or more images based on quality correction information included in the metadata.

The terminal 200 according to an exemplary embodiment parses the metadata to obtain the quality correction information. The quality correction information may include a lens shading correction parameter, a white balancing parameter, and so forth. The terminal 200 corrects pixel values of pixels included in each of the one or more images by using the obtained quality correction information.

In operation S1330, the terminal 200 obtains from the metadata information about mapping between the one or more images and a 3D mesh model used to generate the VR image of the target space.

Operation S1330 may correspond to operation S1220 described with reference to FIG. 12.

In operation S1340, the terminal 200 renders the quality-corrected one or more images based on the information about mapping to generate the VR image of the target space.

The terminal 200 according to an exemplary embodiment may generate the VR image of the target space by mapping the pixels included in the quality-corrected one or more images onto the 3D mesh model, based on the information about mapping.

In operation S1350, the terminal 200 outputs the generated VR image.

Operation S1350 may correspond to operation S1240 described with reference to FIG. 12.

Figure 14:
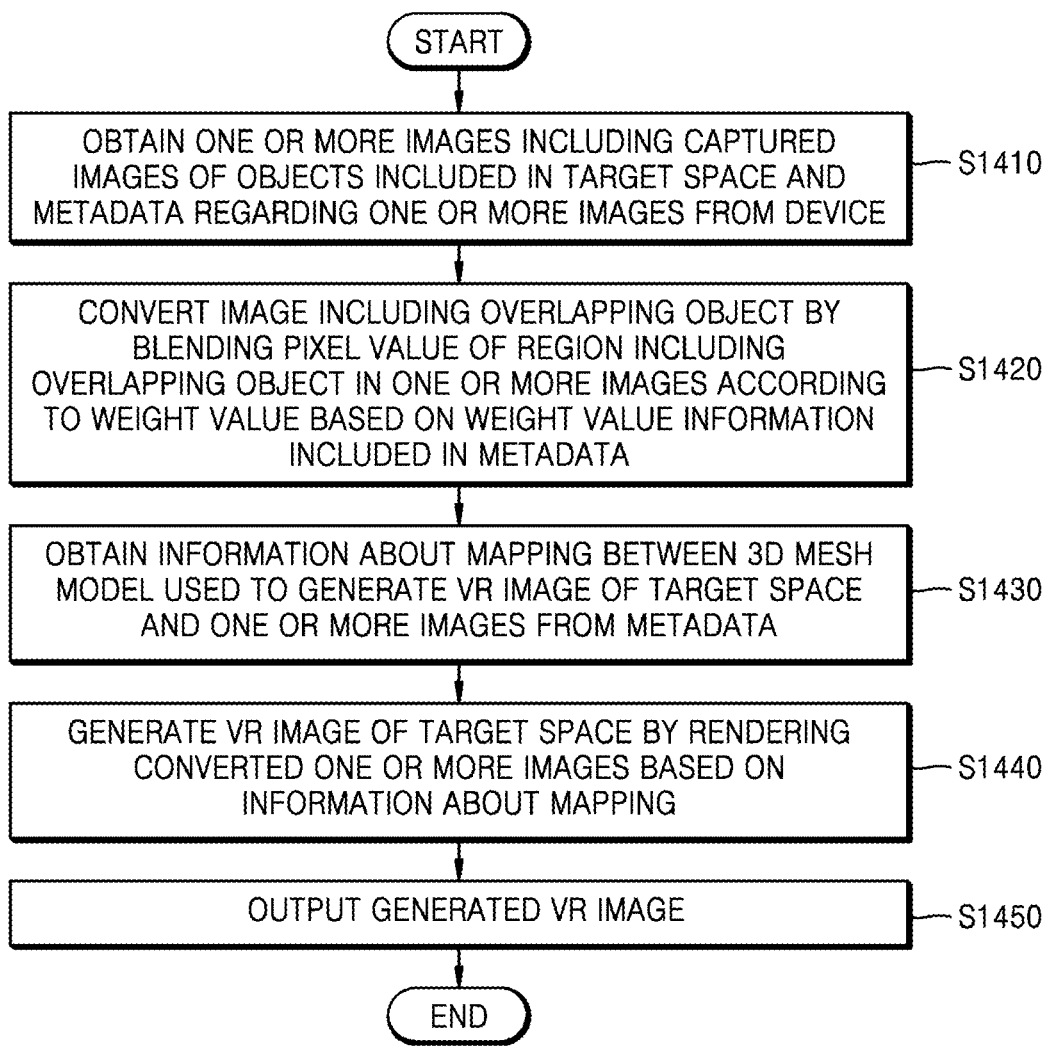
FIG. 14 is a flowchart of a method, performed by a terminal, of processing an image, according to a third exemplary embodiment.

FIG. 14 is a flowchart of a method, performed by the terminal 200, of processing an image, according to a third exemplary embodiment.

In operation S1410, the terminal 200 obtains one or more images, which are or may include captured images of objects included in the target space, and metadata regarding the one or more images from the device 100.

The obtained one or more images may be images generated as a result of applying post-processing, such as the quality correction process, to captured images of objects included in the target space.

In operation S1420, the terminal 200 converts the one or more images by blending pixel values of pixels included in an image including an overlapping object according to a preset weight value based on weight information included in the metadata. The weight information may indicate a weight value for blending pixel values of pixels included in the overlapping object between the one or more images.

The terminal 200 according to an exemplary embodiment parses the metadata to obtain the weight information. The terminal 200 may perform blending by using weight value w1 as a weight value for a pixel a included in a region in which an overlapping object is expressed in a first image and weight value w2 as a weight value for a pixel b included in a region in which the overlapping object is expressed in a second image, respectively.

In operation S1430, the terminal 200 obtains from the metadata information about mapping between the one or more images and a 3D mesh model used to generate the VR image of the target space.

Operation S1430 may correspond to operation S1220 described with reference to FIG. 12.

In operation S1440, the terminal 200 renders the converted one or more images based on the information about mapping to generate the VR image of the target space.

The terminal 200 according to an exemplary embodiment may generate the VR image of the target space by mapping the pixels included in the blended one or more images onto the 3D mesh model, based on the information about mapping.

In operation S1450, the terminal 200 outputs the generated VR image.

Operation S1450 may correspond to operation S1240 described with reference to FIG. 12.

Figure 15:
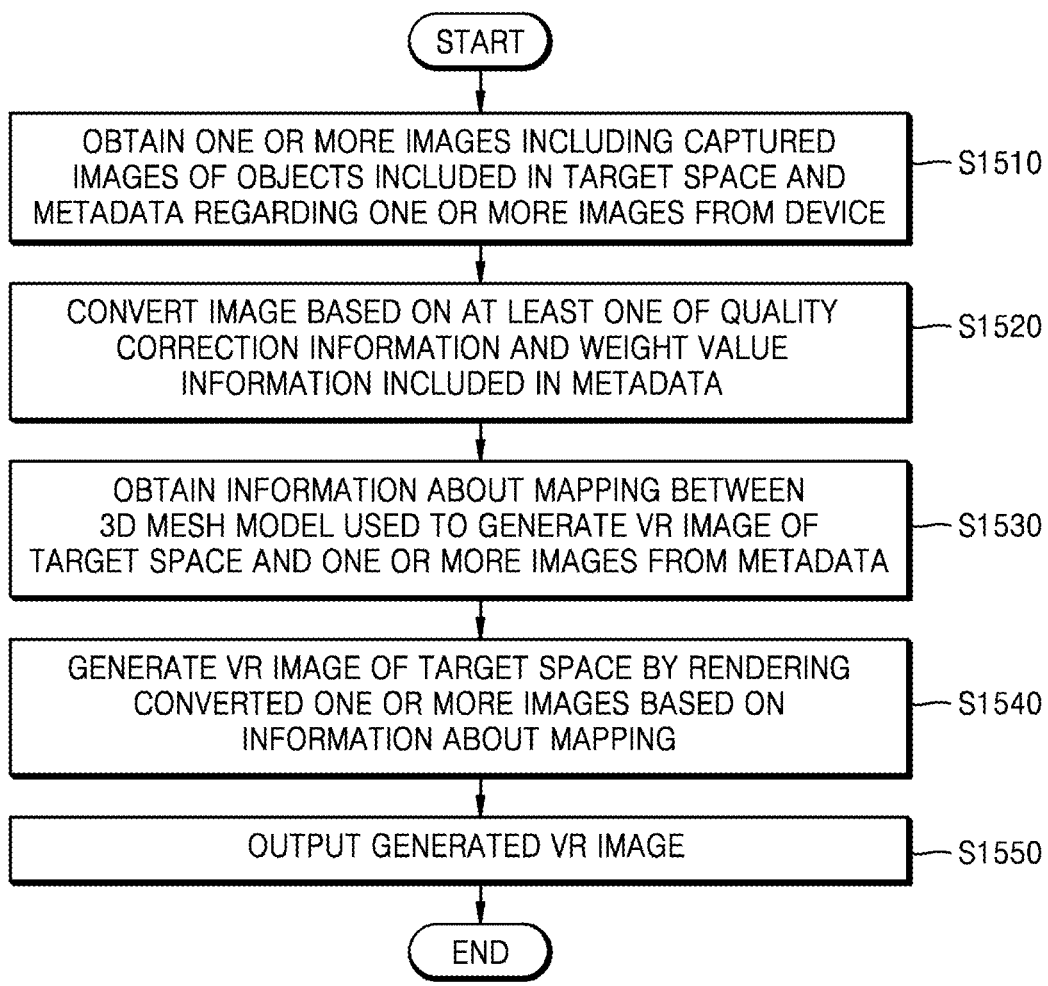
FIG. 15 is a flowchart of a method, performed by a terminal, of processing an image, according to a fourth exemplary embodiment.

FIG. 15 is a flowchart of a method, performed by the terminal 200, of processing an image, according to a fourth exemplary embodiment.

In operation S1510, the terminal 200 obtains one or more images, which are or may include captured images of objects included in the target space, and metadata regarding the one or more images from the device 100.

In operation S1520, the terminal 200 converts the one or more images based on at least one of quality correction information and weight information included in the metadata.

For example, the terminal 200 may convert the one or more images by correcting the quality of the one or more images based on the quality correction information as described with reference to FIG. 13, or by blending pixel values of pixels in an image in which an overlapping object is expressed according to a preset weight value based on the weight information as described with reference to FIG. 14. In another example, the terminal 200 may convert at the least one image by applying the quality correction process based on the quality correction information and the blending process based on the weight information to the one or more images.

In operation S1530, the terminal 200 obtains from the metadata information about mapping between the one or more images and a 3D mesh model used to generate the VR image of the target space.

Operation S1530 may correspond to operation S1220 described with reference to FIG. 12.

In operation S1540, the terminal 200 renders the converted one or more images based on the information about mapping to generate the VR image of the target space.

In operation S1550, the terminal 200 outputs the generated VR image.

Operation S1550 may correspond to operation S1240 described with reference to FIG. 12.

Figure 16:
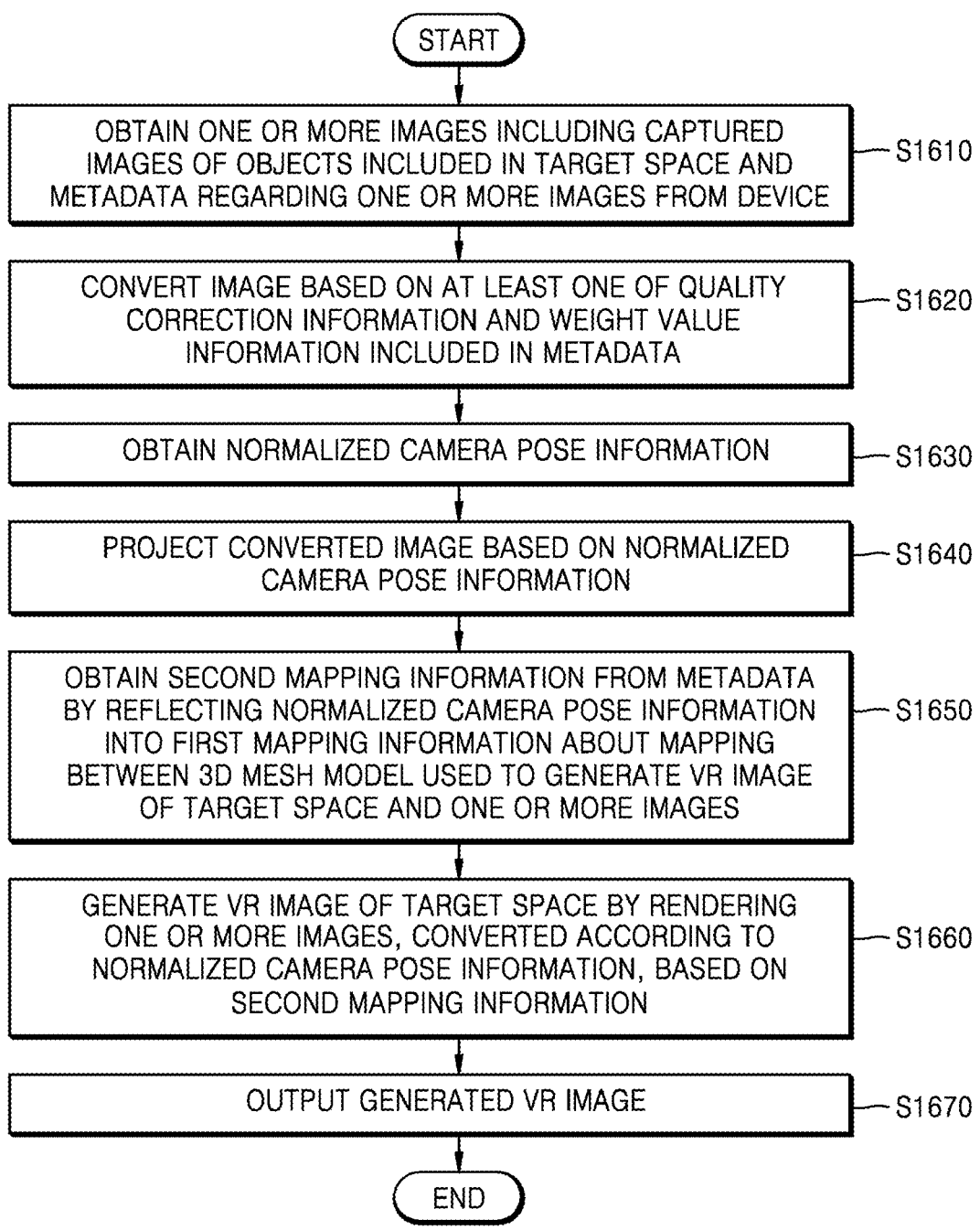
FIG. 16 is a flowchart of a method, performed by a terminal, of processing an image, according to a fifth exemplary embodiment.

FIG. 16 is a flowchart of a method, performed by the terminal 200, of processing an image, according to a fifth exemplary embodiment.

In operation S1610, the terminal 200 obtains one or more images, which are or may include captured images of objects included in the target space, and metadata regarding the one or more images from the device 100.

In operation S1620, the terminal 200 converts the one or more images based on at least one of quality correction information and weight information included in the metadata.

For example, the terminal 200 may convert the one or more images by correcting the quality of the one or more images based on the quality correction information as described with reference to FIG. 13, or by blending pixel values of pixels in an image in which an overlapping object is expressed according to a preset weight value based on the weight information as described with reference to FIG. 14. In another example, the terminal 200 may convert at the least one image by applying the quality correction process based on the quality correction information and the blending process based on the weight information to the one or more images.

In operation S1630, the terminal 200 obtains normalized camera pose information included in the metadata.

In operation S1640, the terminal 200 converts the converted image based on the normalized camera pose information. For example, the terminal 200 may project the converted image to fit a capturing angle included in the normalized camera pose information.

In operation S1650, the terminal 200 obtains second mapping information by reflecting the normalized camera pose information into first mapping information about mapping between a 3D mesh model used to generate the VR image of the target space and the one or more images. For example, the mapping between the mesh model and the one or more images may be converted to fit the capturing angle included in the normalized camera pose information to obtain the second mapping information.

In operation S1660, the terminal 200 renders the one or more images converted based on the normalized camera pose information according to the second mapping information to generate the VR image of the target space.

In operation S1670, the terminal 200 outputs the generated VR image.

Operation S1670 may correspond to operation S1240 described with reference to FIG. 12.

Figure 17:
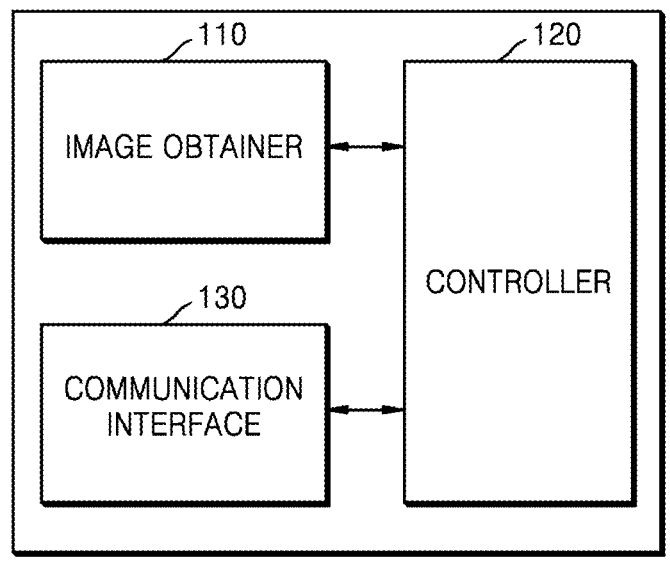
FIG. 17 is a block diagram of a device according to an exemplary embodiment.

FIG. 17 is a block diagram of an electronic device 100, according to an exemplary embodiment of the present disclosure.

As shown in FIG. 17, the electronic device 100 according to an exemplary embodiment may include an image obtainer 110, a controller 120, and a communication interface 130. However, not all of the illustrated elements are essential elements. The electronic device 100 may include a larger or smaller number of elements than the illustrated elements.

The image obtainer 110 obtains one or more images, which are or may include captured images of objects included in the target space.

The image obtainer 110 according to an exemplary embodiment obtains the one or more images from an external capturing device. According to another exemplary embodiment, the device 100 obtains the one or more images by capturing the objects included in the target space using a camera included in the device 100.

The controller 120 generates metadata including information about mapping between a 3D mesh model used to generate the VR image of the target space and the one or more images.

The controller 120 according to an exemplary embodiment determines a type or resolution of the 3D mesh model used to generate the VR image of the target space. The controller 120 determines positions of one or more images mapped onto the 3D mesh model based on the 3D mesh model of the determined type or resolution. For example, the controller 120 determines positions of pixels included in one or more images mapped onto the 3D mesh model, based on information about angles at which the one or more images are captured, positions of capturing devices that capture the one or more images, and so forth.

The controller 120 according to an exemplary embodiment may obtain a capturing parameter regarding arrangement and capturing angles of capturing devices, together with the one or more images. The controller 120 determines positions at which the pixel values of the one or more images are mapped onto the 3D mesh model, based on the obtained capturing parameter.

The metadata generated by the controller 120 according to an exemplary embodiment may further include quality correction information of the one or more images. In another example, the metadata generated by the controller 120 may further include weight information of the one or more images.

The controller 120 according to an exemplary embodiment may perform the quality correction information with respect to the one or more images. For example, the controller 120 may correct pixel values of the one or more images according to a lens shading parameter, a white balancing parameter, etc., of the one or more images.

The controller 120 according to another exemplary embodiment converts the one or more images by blending pixel values of pixels included in the one or more images including an overlapping object according to a preset weight value based on weight information included in the metadata.

The controller 120 according to an exemplary embodiment edits the one or more images, before transmitting the one or more images to the terminal 200 together with the metadata. For example, the controller 120 may change the size and arrangement of the one or more images while maintaining the form of the one or more images. In another example, to minimize a margin region generated due to the circular shape of the image, the controller 120 may edit an image region in the one or more images, excluding the margin region. In another example, the controller 120 may minimize margin regions included in images to be transmitted to the terminal 200 from the device 100, by effectively disposing a region in which an overlapping object is expressed in the one or more images. In another example, the controller 120 may blend overlapping regions included in the one or more images according to a preset weight value to transmit the edited one or more images to the terminal 200 through the communication interface 130.

The controller 120 according to an exemplary embodiment selects a portion of the one or more images. For example, the controller 120 may select a portion of the one or more images, based on object-of-interest information indicating an object in which the user is interested. The selected portion of the one or more images may be transmitted to the terminal 200, together with metadata corresponding to the portion of the one or more images, through the communication interface 130.

The communication interface 130 transmits the one or more images and the metadata to the terminal 200.

The communication interface 130 according to an exemplary embodiment encodes and transmits the one or more images and the metadata to the terminal 200. According to another exemplary embodiment, the communication interface 130 performs the process of correcting the quality of the one or more images and transmits the quality-corrected one or more images and metadata to the terminal 200.

According to another exemplary embodiment, if the controller 120 converts the one or more images by blending pixel values of pixels included in the one or more images including an overlapping object according to a preset weight value, the communication interface 130 transmits the converted one or more images and metadata to the terminal 200.

Figure 18:
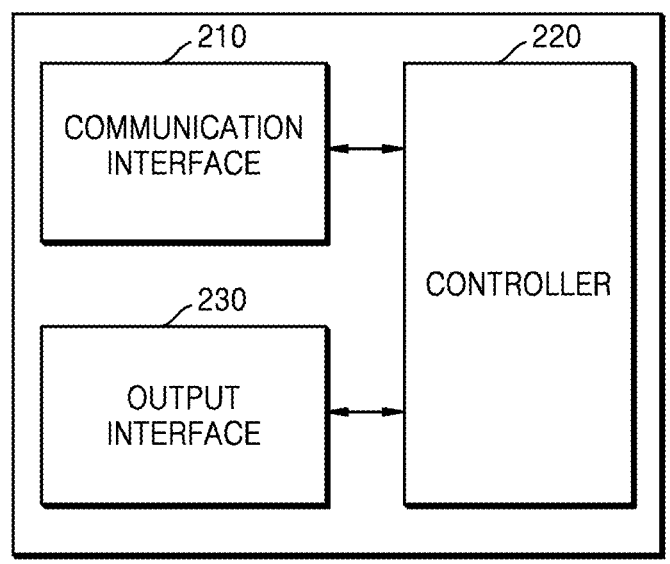
FIGS. 18 and 19 are block diagrams of a terminal according to an exemplary embodiment.
Figure 19:
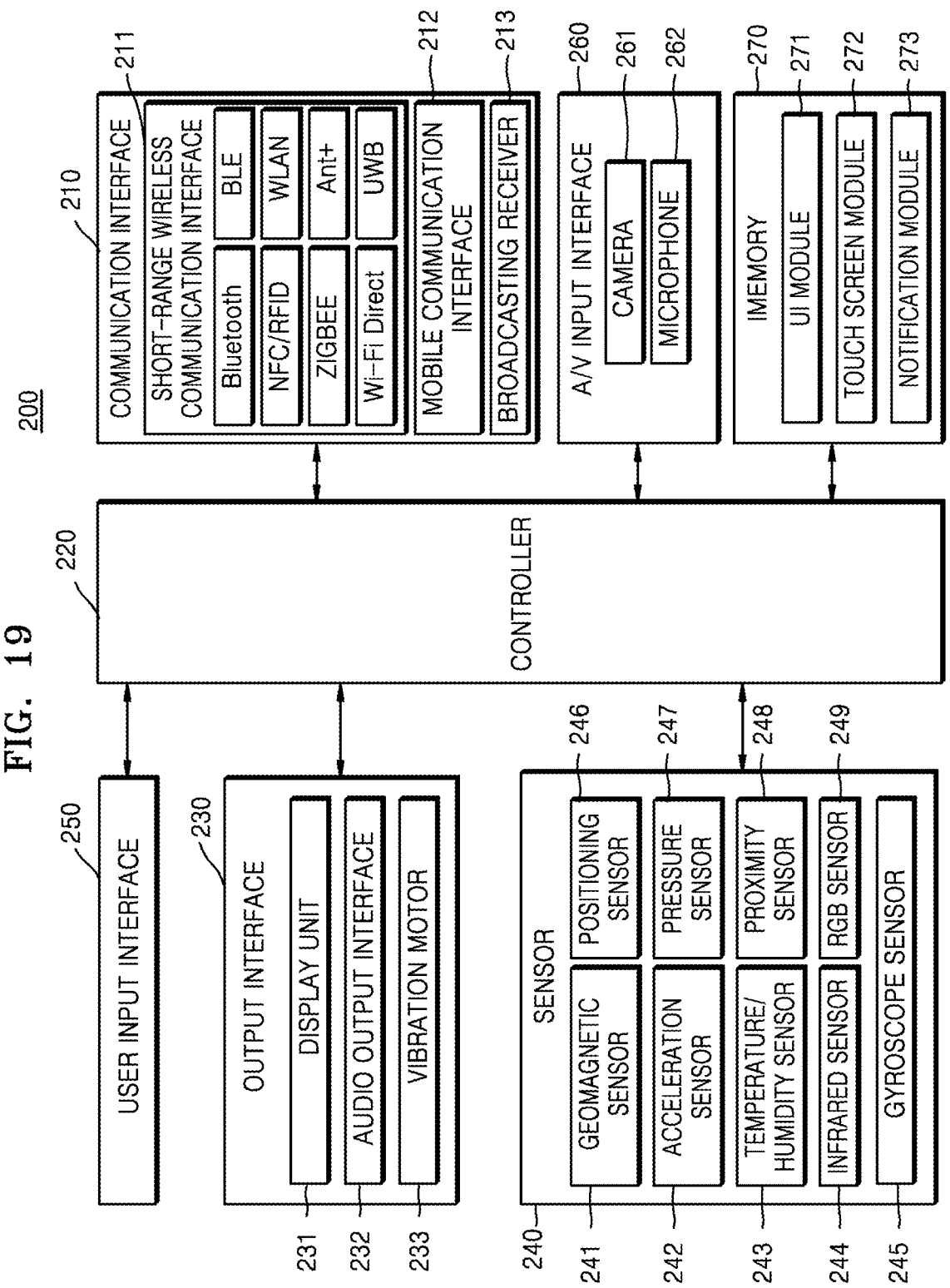

FIGS. 18 and 19 are block diagrams of the terminal 200, according to exemplary embodiments.

As shown in FIG. 18, the terminal 200 according to an exemplary embodiment may include a communication interface 210, a controller 220, and an output interface 230. However, not all of the illustrated elements are essential elements. The terminal 200 may include a larger or smaller number of elements than the illustrated elements.

For example, as shown in FIG. 19, the terminal 200 according to an exemplary embodiment may include a sensor 240, a user input interface 250, an audio/video (AN) input interface 260, and a memory 270 as well as the communication interface 210, the controller 220, and the outputter 230.

Hereinbelow, the foregoing elements will be described in detail.

The communication interface 210 obtains one or more images, which are or may include captured images of objects included in the target space, and metadata regarding the one or more images from the device 100.

The communication interface 210 according to an exemplary embodiment sends a request for the one or more images and the metadata regarding the one or more images to the device 100 to render a VR image of the target space. For example, if receiving a user input for selecting the target space through the user input interface 250, the communication interface 210 may send a request for the one or more images and the metadata regarding the one or more images to the device 100.

The communication interface 210 according to an exemplary embodiment receives one or more images, which are or may include captured images of objects included in the target space, and metadata regarding the one or more images from the device 100 through a preset communication session. The obtained one or more images may be images generated as a result of applying post-processing, such as the quality correction process and the blending process, to captured images of objects included in the target space.

If the terminal 200 is coupled with an external device such as an HMD device, the communication interface 210 according to an exemplary embodiment transmits the VR image generated by the controller 220 to the external device to output the VR image through the external device.

The communication interface 210 may include one or more elements that enable communication between the terminal 200 and the external device (e.g., the device 100 of FIG. 1). For example, the communication interface 210 may include a short-range wireless communication interface 211, a mobile communication interface 212, and a broadcasting receiver 213.

The short-range wireless communication interface 211 may include, but is not limited to, a Bluetooth Low Energy (BLE) communication interface, a near field communication (NFC) unit, a wireless local area network (WLAN) (WiFi) communication interface, a ZigBee communication interface, an infrared Data Association (IrDA) communication interface, a WiFi Direct (WFD) communication interface, an ultra-wideband (UWB) communication interface, and an Ant+ communication interface.

The mobile communication interface 212 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiver 213 receives a broadcast signal and/or broadcasting-related information from an external source through a broadcasting channel. The broadcasting channel may include a satellite channel and a terrestrial channel. According to implementation examples, the terminal 200 may not include the broadcasting receiver 213.

The controller 220 controls an overall operation of the terminal 200. For example, the controller 220 may control in overall the communication interface 210, the outputter 230, the sensor 240, the user input interface 250, the A/V input interface 260, and the memory 270 by executing programs stored in the memory 270.

The controller 220 obtains information about mapping between a 3D mesh model used to generate the VR image of the target space and the one or more images. For example, the controller 220 according to an exemplary embodiment may parse the metadata to obtain the information about mapping.

The controller 220 renders the one or more images based on the information about mapping to generate the VR image of the target space. For example, the controller 220 may generate the VR image of the target space by mapping the pixels included in the one or more images onto the 3D mesh model, based on the information about mapping.

The controller 220 according to an exemplary embodiment corrects the quality of the one or more images based on quality correction information included in the metadata. The controller 220 according to an exemplary embodiment parses the metadata to obtain the quality correction information. The controller 220 corrects pixel values of pixels included in each of the one or more images by using the obtained quality correction information. The controller 220 renders the quality-corrected one or more images based on the information about mapping to generate the VR image of the target space.

The controller 200 according to another exemplary embodiment converts the one or more images by blending pixel values of pixels included in the one or more images including an overlapping object according to a preset weight value based on weight information included in the metadata. The controller 220 renders the converted one or more images based on the information about mapping to generate the VR image of the target space.

The output interface 230 outputs an audio signal, a video signal, or a vibration signal, and may include a display 231, an audio output interface 232, a vibration motor 233, and so forth.

The display 231 displays information processed by the terminal 200. For example, the display 231 may output the VR image generated as a result of rendering in the controller 220. The display 231 outputs at least a region of the VR image, which corresponds to a user's gaze sensed by the sensor 240.

In another example, the display 231 displays a menu for selecting one of a plurality of target spaces.

When the display 231 and a touch pad are constructed as a touch screen in a layer structure, the display 231 may be used as an input device as well as an output device. The display 231 may include at least one of a liquid crystal display (LCD), a thin film transistor (TFT) LCD, an organic light-emitting diode (OLED), a flexible display, a 3D display, and an electrophoretic display. According to implementation types of the terminal 200, the terminal 200 may include two or more displays 231. In this case, the two or more displays 231 may be disposed to face each other by using a hinge.

The audio output interface 232 outputs audio data received from the communication interface 210 or stored in the memory 270. The audio output interface 232 outputs an audio signal related to a function (e.g., a call signal receiving sound, a message receiving sound, an alarm sound, etc.) performed in the terminal 200. The audio output interface 232 may include a speaker, a buzzer, or the like.

The vibration motor 233 outputs a vibration signal. For example, the vibration motor 233 may output a vibration signal corresponding to output of audio data or video data. The vibration motor 233 outputs a vibration signal if a touch is input to a touch screen.

The sensor 240 senses at least one of a state of the terminal 200, a surrounding state of the terminal 200, and a state of a user wearing the terminal 200, and delivers sensed information to the controller 220. For example, the sensor 240 may sense a gaze of the user wearing the terminal 200 or a motion of a head of the user.

The sensor 240 may include, but is not limited to, at least one of a geomagnetic sensor 241, an acceleration sensor 242, a temperature/humidity sensor 243, an infrared sensor 244, a gyroscope sensor 245, a positioning sensor (e.g., a global positioning system (GPS)) 246, a pressure sensor 247, a proximity sensor 248, and a red/green/blue (RGB) sensor (or an illuminance sensor) 249. A function of each sensor may be intuitively construed from a name of each sensor by those of ordinary skill in the art, and thus will not be described in detail.

The user input interface 250 is a means for inputting data for controlling the terminal 200. For example, the user input interface 250 may include, but is not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The user input interface 250 receives a user input requesting the VR image of the target space. The user input interface 250 receives a user input for selecting at least one of objects of the target space. However, this is merely an example, and a type of the user input received by the user input interface 250 is not limited to the above-described example.

The A/V input interface 260 inputs an audio signal or a video signal, and may include a camera 261, a microphone 262, and so forth. The camera 261 obtains an image frame such as a still image or a moving image in a video communication mode or a photographing mode through an image sensor. The image captured by the image sensor is processed by the controller 220 or a separate image processor.

An image frame processed by the camera 261 is stored in the memory 270 or transmitted to an external source through the communication interface 210. Two or more cameras 261 may be provided according to a structure aspect of the terminal 200.

The microphone 262 receives an external audio signal and processes the received signal into electric voice data. For example, the microphone 262 may receive an audio signal from an external device or a speaker. The microphone 262 uses various noise cancellation algorithms for canceling noise generated during reception of the external audio signal.

The memory 270 stores programs for processing and control by the controller 220 and stores input/output data (one or more images, metadata regarding the one or more images, and a VR image generated as a result of rendering, received from the device 100).

The memory 270 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth. The device 100 operates a web storage or a cloud server that performs a storage function of the memory 270 on the Internet.

The programs stored in the memory 270 may be classified into a plurality of modules depending on a function thereof, e.g., a user interface (UI) module 271, a touch screen module 272, a notification module 273, and so forth.

The UI module 271 provides a specialized UI or graphic UI (GUI) interworking with the terminal 200 for each application. The touch screen module 272 senses a touch gesture of a user on a touch screen and delivers information about the touch gesture to the controller 220. The touch screen module 272 according to an exemplary embodiment of the present disclosure recognizes and analyzes a touch code. The touch screen module 272 is configured with separate hardware including a controller.

To sense a touch or proximity touch on the touch screen, various sensors may be provided inside or near the touch screen. An example of the sensor for sensing a touch on the touch screen may be a tactile sensor. The tactile sensor refers to a sensor that senses a touch by a particular object to the extent or larger to which a person feels the touch. The tactile sensor senses a lot of information such as the roughness of a contact surface, the hardness of a contact object, the temperature of a contact point, etc.

An example of the sensor for sensing a touch on the touch screen may be a proximity sensor.

The proximity sensor refers to a sensor that detects existence or absence of an object that approaches or is in proximity to a detection surface by using the force of an electromagnetic field or infrared rays, without a mechanical contact. Examples of the proximity sensor may include a transmission optoelectronic sensor, a direct reflective optoelectronic sensor, a mirror reflective optoelectronic sensor, a radio frequency oscillation proximity sensor, an electrostatic capacity proximity sensor, a magnetic proximity sensor, an infrared proximity sensor, and so forth. The user's touch gesture may include a tap, a touch & hold, a double tap, a drag, panning, a flick, a drag & drop, a swipe, and so forth.

The notification module 273 generates a signal for notifying of an occurrence of an event of the terminal 200. Examples of the event occurring in the terminal 200 may include key signal input, and so forth. The notification module 273 outputs a notification signal in the form of a video signal through the display 231, in the form of an audio signal through the audio output interface 232, and/or in the form of a vibration signal through the vibration motor 233.

The methods according to the exemplary embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present exemplary embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include a machine language code created by a complier and a high-level language code executable by a computer using an interpreter.

While the present disclosure has been shown and described with reference to certain example embodiments thereof, the scope of the present disclosure is not limited to the description and also includes various modifications and improvements made by those of ordinary skill in the art using the concept of the present disclosure defined in the appended claims.

What is claimed is:

1. A method, performed by a terminal, of processing an image, the method comprising:
    obtaining a plurality of circular images captured at a camera, which are not stitched, and metadata regarding the plurality of circular images;
    obtaining parameters regarding lens shading compensation information and overlapped region information for the plurality of circular images from the metadata;
    identifying overlapped regions between the plurality of circular images based on the overlapped region information;
    stitching the plurality of circular images based on the obtained parameters by blending the overlapped regions according to a plurality of preset weight values included in the metadata; and
    rendering a stitched image,
    wherein the parameters comprise a resolution of a 3D mesh model and information specifying a type of the 3D mesh model.

2. The method of claim 1, wherein the parameters comprise an angle at which the plurality of circular images are captured.

3. The method of claim 1, further comprising:
    obtaining quality correction information from the metadata; and
    correcting the plurality of circular images based on the quality correction information.

4. The method of claim 1, wherein the overlapped regions comprise a first overlapped region and a second overlapped region, and
    wherein the overlapped regions are blended by summing a first pixel value of the first overlapped region with a corresponding second pixel value of the second overlapped region according to the plurality of preset weight values.

5. The method of claim 1, wherein the plurality of preset weight values comprises a first preset weight value applied to a first pixel value of a first circular image of the plurality of circular images, and a second preset weight value applied to a second pixel value of a second circular image of the plurality of circular images.

6. A method, performed by a device, of processing an image, the method comprising:
    obtaining a plurality of circular images captured at a camera and metadata including parameters regarding camera location information, lens shading compensation information and overlapped region information for the plurality of circular images; and
    transmitting the plurality of circular images which are not stitched and the metadata, to a terminal,
    wherein the plurality of circular images are stitched based on the obtained parameters by blending overlapped regions identified based on the overlapped region information according to a plurality of preset weight values included in the metadata, and
    the plurality of stitched circular images are rendered at the terminal, and
    wherein the parameters comprise a resolution of a 3D mesh model and information specifying a type of the 3D mesh model.

7. The method of claim 6, wherein the parameters comprise an angle at which the plurality of circular images are captured.

8. The method of claim 6, wherein quality correction information is obtained from the metadata, and
    the plurality of circular images are corrected based on the quality correction information.

9. A terminal of processing an image, the terminal comprising:
    a transceiver and
    at least one processor configured to:
    obtain, via the transceiver, a plurality of circular images captured at a camera, which are not stitched, and metadata regarding the plurality of circular images,
    obtain parameters regarding lens shading compensation information and overlapped region information for the plurality of circular images from the metadata,
    identify overlapped regions between the plurality of circular images based on the overlapped region information;
    stitch the plurality of circular images based on the obtained parameters by blending the overlapped regions according to a plurality of preset weight values included in the metadata, and
    render a stitched image,
    wherein the parameters comprise a resolution of a 3D mesh model and information specifying a type of the 3D mesh model.

10. The terminal of claim 9, wherein the parameters comprise an angle at which the plurality of circular images are captured.

11. The terminal of claim 9, wherein the at least one processor is further configured to obtain quality correction information from the metadata and correct the plurality of circular images based on the quality correction information.

12. A device of processing an image, the device comprising:
    a transceiver and
    at least one processor configured to:
    obtain a plurality of circular images captured at a camera and metadata including parameters regarding lens shading compensation information and overlapped region information for the plurality of circular images, and
    transmit, via the transceiver, the plurality of circular images which are not stitched and the metadata, to a terminal,
    wherein the plurality of circular images are stitched based on the obtained parameters by blending the overlapped regions identified based on the overlapped region information according to a plurality of preset weight values included in the metadata, and
    a stitched image is rendered at the terminal, wherein the parameters comprise a resolution of a 3D mesh model and information specifying a type of the 3D mesh model.

13. The device of claim 12, wherein the parameters comprise an angle at which the plurality of circular images are captured.

14. The device of claim 12, wherein quality correction information is obtained from the metadata, and
the plurality of circular images are corrected based on the quality correction information.

\* \* \* \* \*